(12) United States Patent
Yi et al.

(10) Patent No.: US 12,284,646 B2
(45) Date of Patent: Apr. 22, 2025

(54) METHOD AND APPARATUS FOR TRANSMITTING UPLINK CHANNEL IN WIRELESS COMMUNICATION SYSTEM

(71) Applicant: Samsung Electronics Co., Ltd., Suwon-si (KR)

(72) Inventors: Junyung Yi, Suwon-si (KR); Youngbum Kim, Suwon-si (KR); Sungjin Park, Suwon-si (KR); Cheolkyu Shin, Suwon-si (KR); Heedon Gha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 441 days.

(21) Appl. No.: 17/711,604

(22) Filed: Apr. 1, 2022

(65) Prior Publication Data

US 2022/0322394 A1 Oct. 6, 2022

(30) Foreign Application Priority Data

Apr. 2, 2021 (KR) .................. 10-2021-0043611

(51) Int. Cl.
*H04W 72/1268* (2023.01)
*H04B 1/7143* (2011.01)
*H04L 1/08* (2006.01)

(52) U.S. Cl.
CPC ...... *H04W 72/1268* (2013.01); *H04B 1/7143* (2013.01); *H04L 1/08* (2013.01)

(58) Field of Classification Search
None
See application file for complete search history.

(56) References Cited

U.S. PATENT DOCUMENTS 11,304,219 B2 4/2022 Fakoorian et al.
2020/0214006 A1* 7/2020 Choi ................ H04W 72/23
(Continued)

FOREIGN PATENT DOCUMENTS

WO 2020/146672 A1 7/2020
WO WO-2022155108 A1 * 7/2022

OTHER PUBLICATIONS

3GPP "FL Summary of TB Processing Over Multi-Slot PUSCH (AI 8.8.1.2)" TSG RAN WG1 #104-e, Feb. 5, 2021 (Year: 2021).*
(Continued)

*Primary Examiner* — Jamaal Henson
(74) *Attorney, Agent, or Firm* — Jefferson IP Law, LLP

(57) ABSTRACT

The disclosure relates to a fifth generation (5G) or sixth generation (6G) communication system for supporting a higher data transmission rate. A method for improving the coverage of an uplink channel for uplink transmission is provided. The method includes receiving, from a base station, configuration information including resource allocation information for transport block (TB) processing over multiple slots (TBoMS), repetitive transmission configuration information, and frequency hopping information, identifying whether repetitive transmission of the TBoMS is configured, based on the configuration information, determining a frequency hopping pattern between TBoMS repetitive transmissions based on the frequency hopping information and a number of slots for frequency hopping in case that the repetitive transmission of the TBoMS is configured, and performing the repetitive transmission of the TBoMS based on the frequency hopping pattern.

15 Claims, 19 Drawing Sheets

(56) References Cited

U.S. PATENT DOCUMENTS

| | | | | |
|---|---|---|---|---|
| 2020/0374896 A1* | 11/2020 | Bae | ................... | H04B 1/7143 |
| 2021/0282137 A1* | 9/2021 | Wang | ................... | H04W 72/23 |
| 2022/0029659 A1* | 1/2022 | Liu | ................... | H04W 72/23 |
| 2022/0095353 A1* | 3/2022 | Liu | ................... | H04W 72/23 |
| 2022/0312383 A1* | 9/2022 | Ly | ................... | H04W 72/0446 |
| 2022/0393717 A1* | 12/2022 | Li | ................... | H04L 5/0094 |
| 2023/0068475 A1* | 3/2023 | Yang | ................... | H04L 1/08 |
| 2023/0396373 A1* | 12/2023 | Gao | ................... | H04L 1/1861 |
| 2024/0163012 A1* | 5/2024 | Liu | ................... | H04W 72/232 |

OTHER PUBLICATIONS

3GPP "3rd Generation Partnership Project; Technical Specification Group Radio Access Network; NR; Physical Layer Procedures for Data, (Release 16)" 38.214 version 16.5.0 (Mar. 2021) (Year: 2021).*
Samsung, 'TB processing over multi-slot PUSCH', R1-2101222, 3GPP TSG RAN WG1 #104-e, Jan. 19, 2021.
Lenovo et al., 'Enhancements for TB processing over multi-slot PUSCH', R1-2101002, 3GPP TSG RAN WG1 #104-e, Jan. 19, 2021.
Intel Corporation, 'Discussion on TB processing over multi-slot PUSCH', R1-2100666, 3GPP TSG RAN WG1 #104-e, Jan. 19, 2021.
Panasonic, 'Discussion on TB processing over multi-slot PUSCH', R1-2101018, 3GPP TSG RAN WG1 #104-e, Jan. 18, 2021.
International Search Report dated Jun. 17, 2022, issued in International Patent Application No. PCT/KR2022/004767.

* cited by examiner

FIG. 3

One symbol pattern

301:
| 2/3 | CDM group1 |
| 0/1 | CDM group0 |
| 2/3 | CDM group1 |
| 0/1 | CDM group0 |
| 2/3 | CDM group1 |
| 0/1 | CDM group0 |
| 2/3 | CDM group1 |
| 0/1 | CDM group0 |
| 2/3 | CDM group1 |
| 0/1 | CDM group0 |
| 2/3 | CDM group1 |
| 0/1 | CDM group0 |

Two symbol pattern

302:
| 2/3/6/7 | CDM group1 |
| 0/1/4/5 | CDM group0 |
| 2/3/6/7 | CDM group1 |
| 0/1/4/5 | CDM group0 |
| 2/3/6/7 | CDM group1 |
| 0/1/4/5 | CDM group0 |
| 2/3/6/7 | CDM group1 |
| 0/1/4/5 | CDM group0 |
| 2/3/6/7 | CDM group1 |
| 0/1/4/5 | CDM group0 |
| 2/3/6/7 | CDM group1 |
| 0/1/4/5 | CDM group0 |

One symbol pattern

303:
| 4/5 | CDM group2 |
| 4/5 | |
| 2/3 | CDM group1 |
| 2/3 | |
| 0/1 | CDM group0 |
| 0/1 | |
| 4/5 | CDM group2 |
| 4/5 | |
| 2/3 | CDM group1 |
| 2/3 | |
| 0/1 | CDM group0 |
| 0/1 | |

Two symbol pattern

304:
| 4/5/10/11 | CDM group2 |
| 4/5/10/11 | |
| 2/3/8/9 | CDM group1 |
| 2/3/8/9 | |
| 0/1/6/7 | CDM group0 |
| 0/1/6/7 | |
| 4/5/10/11 | CDM group2 |
| 4/5/10/11 | |
| 2/3/8/9 | CDM group1 |
| 2/3/8/9 | |
| 0/1/6/7 | CDM group0 |
| 0/1/6/7 | |

FIG. 7
Transport block processing over multi-slot PUSCH(TBoMS):
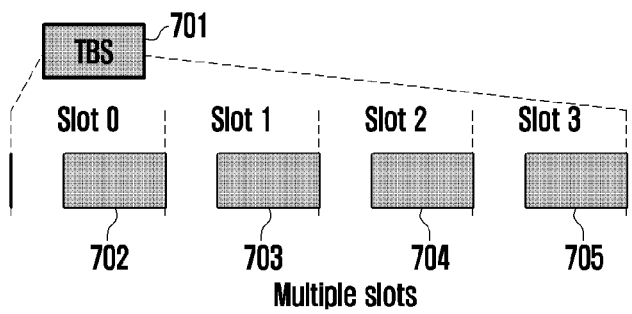
PUSCH repetition type A like TDRA for TBoMS (S=5, L=9, k=4) (706):
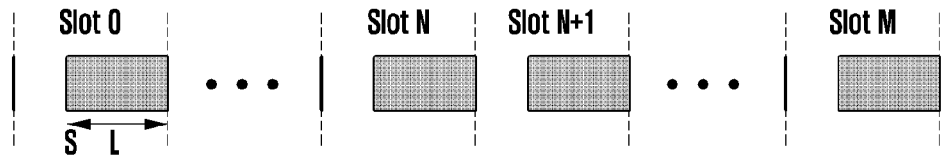
PUSCH repetition type B like TDRA with long symbol L for TBoMS (707):
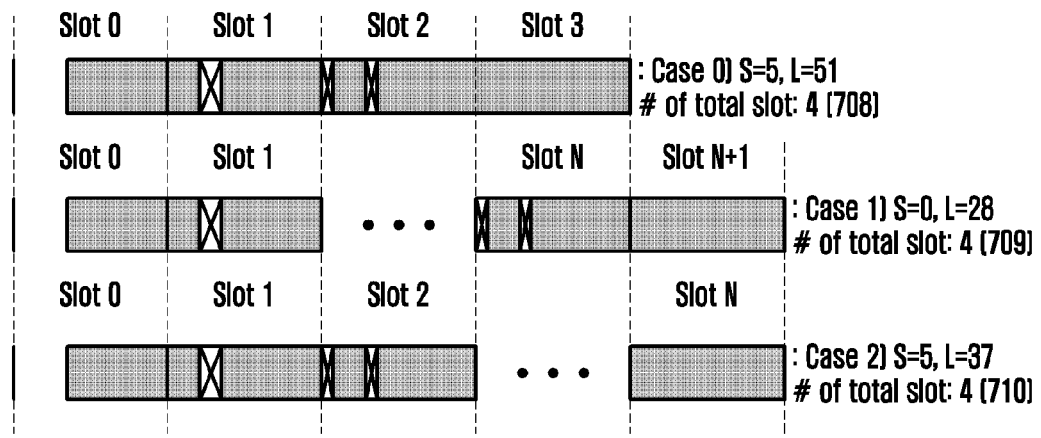

FIG. 15
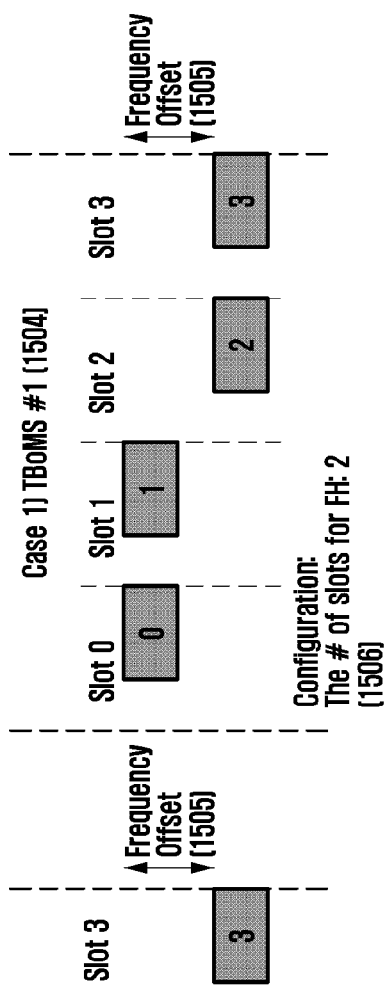
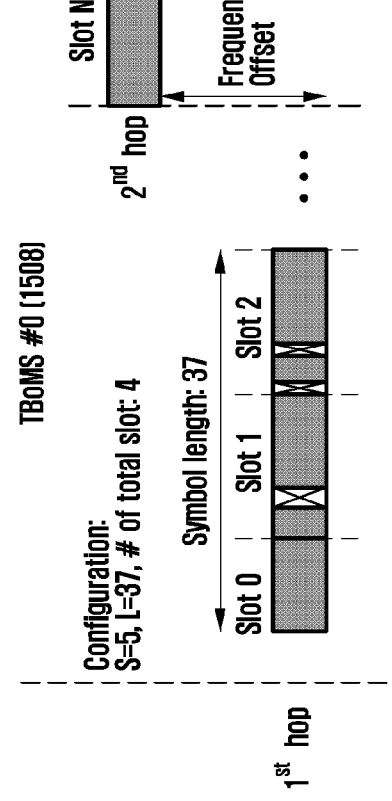
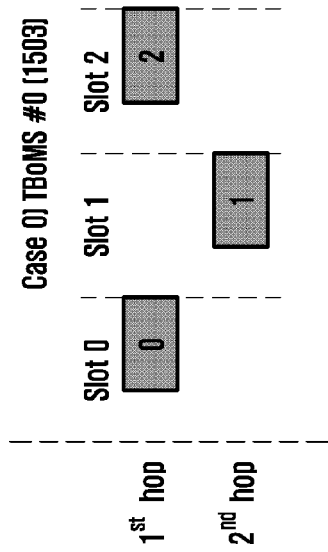

METHOD AND APPARATUS FOR TRANSMITTING UPLINK CHANNEL IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0043611, filed on Apr. 2, 2021, in the Korean Intellectual Property Office, the disclosure of which is incorporated by reference herein in its entirety.

BACKGROUND

1. Field

The disclosure relates to a method and an apparatus wherein a base station or a terminal transmits/receives an uplink channel in a wireless communication system.

2. Description of Related Art

Fifth generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multi input multi output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of Band-Width Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random-access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for transmitting a physical uplink shared channel (PUSCH) by using multiple slots in order to improve the coverage of an uplink channel in a wireless communication system.

Additional aspects will be set forth in part in the description which follows and, in part, will be apparent from the description, or may be learned by practice of the presented embodiments.

In accordance with an aspect of the disclosure, a method performed by a terminal 1 in a communication system is provided. The method includes receiving, from a base station, configuration information including resource allocation information for transport block (TB) processing over multiple slots (TBoMS), repetitive transmission configuration information, and frequency hopping information, identifying whether repetitive transmission of the TBoMS is configured, based on the configuration information, determining a frequency hopping pattern between TBoMS repetitive transmissions based on the frequency hopping information and a number of slots for frequency hopping in case that the repetitive transmission of the TBoMS is configured, and performing the repetitive transmission of the TBoMS based on the frequency hopping pattern.

In accordance with another aspect of the disclosure, a method performed by a base station in a communication system is provided. The method includes transmitting, to a terminal, configuration information including resource allocation information for transport block (TB) processing over multiple slots (TBoMS), repetitive transmission configuration information, and frequency hopping information, identifying whether repetitive transmission of the TBoMS is configured, based on the configuration information, and receiving the repetitive transmission of the TBoMS based on a frequency hopping pattern between TBoMS repetitive transmissions based on the frequency hopping information and a number of slots for frequency hopping in case that the TBoMS repetitive transmission is configured.

In accordance with another aspect of the disclosure, a terminal in a communication system is provided. The terminal includes a transceiver, and a controller configured to receive, from a base station, configuration information including resource allocation information for transport block (TB) processing over multiple slots (TBoMS), repetitive transmission configuration information, and frequency hopping information, identify whether repetitive transmission of the TBoMS is configured, based on the configuration information, determine a frequency hopping pattern between TBoMS repetitive transmissions based on the frequency hopping information and a number of slots for frequency hopping in case that the repetitive transmission of the TBoMS is configured, and perform the repetitive transmission of the TBoMS based on the frequency hopping pattern.

In accordance with another aspect of the disclosure, a base station in a communication system is provided. The base station includes a transceiver, and a controller configured to transmit, to a terminal, configuration information including resource allocation information for transport block (TB) processing over multiple slots (TBoMS), repetitive transmission configuration information, and frequency hopping information, identify whether repetitive transmission of the TBoMS is configured, based on the configuration information, and receive the repetitive transmission of the TBoMS based on a frequency hopping pattern between TBoMS repetitive transmissions based on the frequency hopping information and a number of slots for frequency hopping in case that the TBoMS repetitive transmission is configured.

An embodiment of the disclosure provides a frequency hopping method for uplink transmission in which a single transport block (TB) is mapped to multiple slots, and a method for configuring interleaving and frequency hopping and for repetitive transmission. Through methods of the disclosure, an additional channel coding gain may be obtained, and the coverage of an uplink channel may be improved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 illustrates DMRS patterns (type1 and type2) used for communication between a base station and a terminal in a 5G system according to an embodiment of the disclosure;

FIG. 7 illustrates an example of one TB processing over multi-slot PUSCH transmission (TBoMS) in a 5G system according to an embodiment of the disclosure;

FIG. 15 illustrates an example of a method for performing frequency hopping for multiple slots for one TB processing over multi-slot PUSCH (TBoMS) transmission according to an embodiment of the disclosure;

Throughout the drawings, it should be noted that like reference numbers are used to depict the same or similar elements, features, and structures.

DETAILED DESCRIPTION

Figure 1:
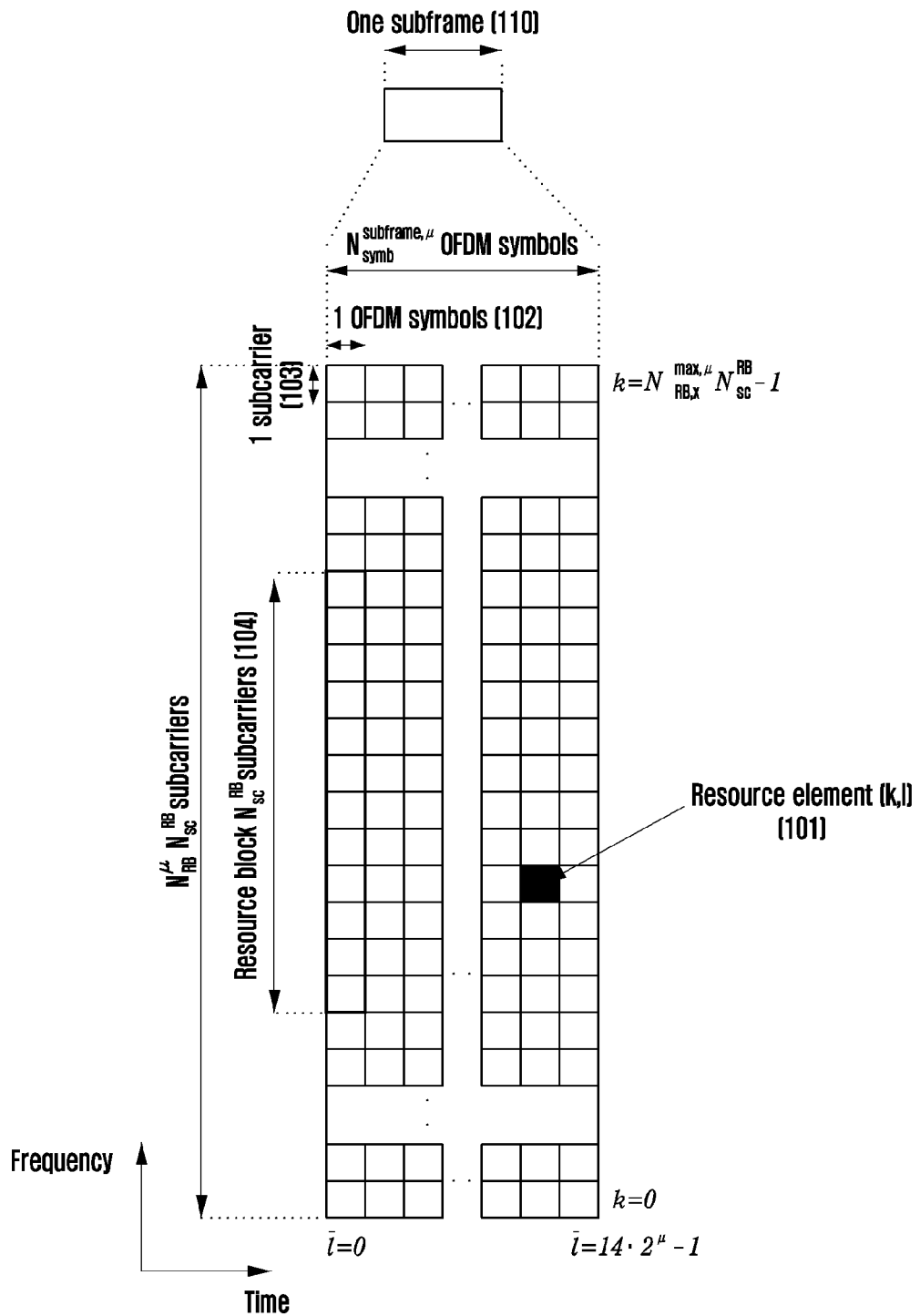
FIG. 1 illustrates a basic structure of a time-frequency domain, which is a radio resource domain in which data or a control channel is transmitted in a 5G system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Further, in the following description, long-term evolution (LTE) or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Hereinafter, embodiments of the disclosure will be described in detail with reference to the accompanying drawings. Hereinafter, a method and an apparatus proposed in the embodiment of the disclosure describe the embodiment of the disclosure as an example for improving PUSCH coverage, are not limited to each embodiment, and can be utilized for a frequency resource configuration method corresponding to another channel by using all of one or more embodiments proposed in the disclosure or a combination of some embodiments. Accordingly, the embodiments of the disclosure may be applied through some modifications within a range that does not significantly deviate from the scope of the disclosure as determined by a person skilled in the art.

Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Wireless communication systems have been developed from wireless communication systems providing voice centered services to broadband wireless communication systems providing high-speed, high-quality packet data services, such as communication standards of high speed packet access (HSPA), long-term evolution (LTE or evolved universal terrestrial radio access (E-UTRA)), LTE-advanced (LTE-A), and LTE-Pro of the 3GPP, high rate packet data (HRPD) and ultra-mobile broadband (UMB) of 3GPP2, and 802.17e of IEEE.

An LTE system that is a representative example of the broadband wireless communication system has adopted an orthogonal frequency division multiplexing (OFDM) scheme in a downlink (DL) and has adopted a single carrier frequency division multiple access (SC-FDMA) scheme in an uplink (UL). The UL refers to a wireless link through which a terminal (user equipment (UE) or mobile station (MS)) transmits data or a control signal to a base station (eNodeB (eNB) or BS), and the DL refers to a wireless link through which a base station transmits data or a control signal to a terminal. The multiple access scheme as described above normally allocates and operates time-frequency resources including data or control information to be transmitted according to each user so as to prevent the time-frequency resources from overlapping with each other, that is, to establish orthogonality for distinguishing the data or the control information of each user.

As a future communication system after the LTE system, a 5G communication system should support services satisfying various requirements at the same time, so as to freely reflect various requirements of a user and a service provider. The services considered for the 5G communication system include enhanced mobile broadband (eMBB), massive machine-type communication (mMTC), ultra-reliability low latency communication (URLLC), and the like.

eMBB aims to provide a higher data transmission rate than a data transmission rate supported by the LTE, LTE-A, or LTE-Pro. For example, in the 5G communication system, eMBB should be able to provide a peak data rate of 20 Gbps in the DL and a peak data rate of 10 Gbps in the UL from the viewpoint of one base station. In addition, the 5G communication system should provide the increased user perceived data rate of the terminal simultaneously with providing the peak data rate. In order to satisfy such requirements, improvement of various transmitting/receiving technologies including a further improved multi input multi output (MIMO) transmission technology is needed. In addition, signals are transmitted using a transmission bandwidth of up to 20 MHz in a 2 GHz band used by the LTE, but the 5G communication system uses a bandwidth wider than 20 MHz in a frequency band of 3 to 6 GHz or more than 6 GHz, thereby satisfying a data transmission rate required in the 5G communication system.

Simultaneously, mMTC is being considered to support application services such as Internet of Thing (IoT) in the 5G communication system. mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/km$^2$) in a cell because it is attached to various sensors and devices to provide communication functions. In addition, since the terminals supporting mMTC are more likely to be positioned in shaded areas not covered by a cell, such as a basement of a building due to nature of services, the terminals require a wider coverage than other services provided by the 5G communication system. The terminals that support mMTC should be configured as inexpensive terminals and require very long battery life-time, such as 10 to 16 years, because it is difficult to frequently replace batteries of the terminals.

Finally, URLLC is a cellular-based wireless communication service used for mission-critical purposes. For example, URLLC may consider a service used in remote control for robots or machinery, industrial automation, unmanned aerial vehicles, remote health care, or emergency alerts. Accordingly, communication provided by URLLC should provide very low latency and very high reliability. For example, URLLC-supportive services need to meet an air interface latency of less than 0.5 milliseconds and simultaneously include requirements of a packet error rate of 10$^{-5}$ or less. Accordingly, for URLLC-supportive services, the 5G system may be required to provide a transmit time interval (TTI) shorter than those for other services while securing reliable communication links by allocating a broad resource in a frequency band.

The three services, i.e., eMBB, URLLC, and mMTC, considered in the above 5G communication system (hereinafter, interchangeably used with 5G system) may be multiplexed in one system and may be transmitted. The services may use different transmission/reception techniques and transmission/reception parameters in order to satisfy different requirements.

Hereinafter, the frame structure of a 5G system will be described in more detail with reference to the drawings.

FIG. 1 illustrates a basic structure of a time-frequency domain, which is a radio resource domain of a 5G system according to an embodiment of the disclosure.

Referring to FIG. 1, the horizontal axis represents a time domain, and the vertical axis represents a frequency domain. A basic unit of resources in the time-frequency domain may be a resource element (RE) 101. The resource element 101 may be defined by 1 OFDM symbol (or discrete Fourier transform spread OFDM (DFT-s-OFDM) symbol 102 in a time domain and 1 subcarrier 103 in a frequency domain. In the frequency domain, $N_{SC}^{RB}$ (for example, 12) consecutive REs may configure one resource block (RB) 104. In addition, $N_{symb}^{subframe}$ consecutive OFDM symbols in the time domain may configure one subframe 110.

Figure 2:
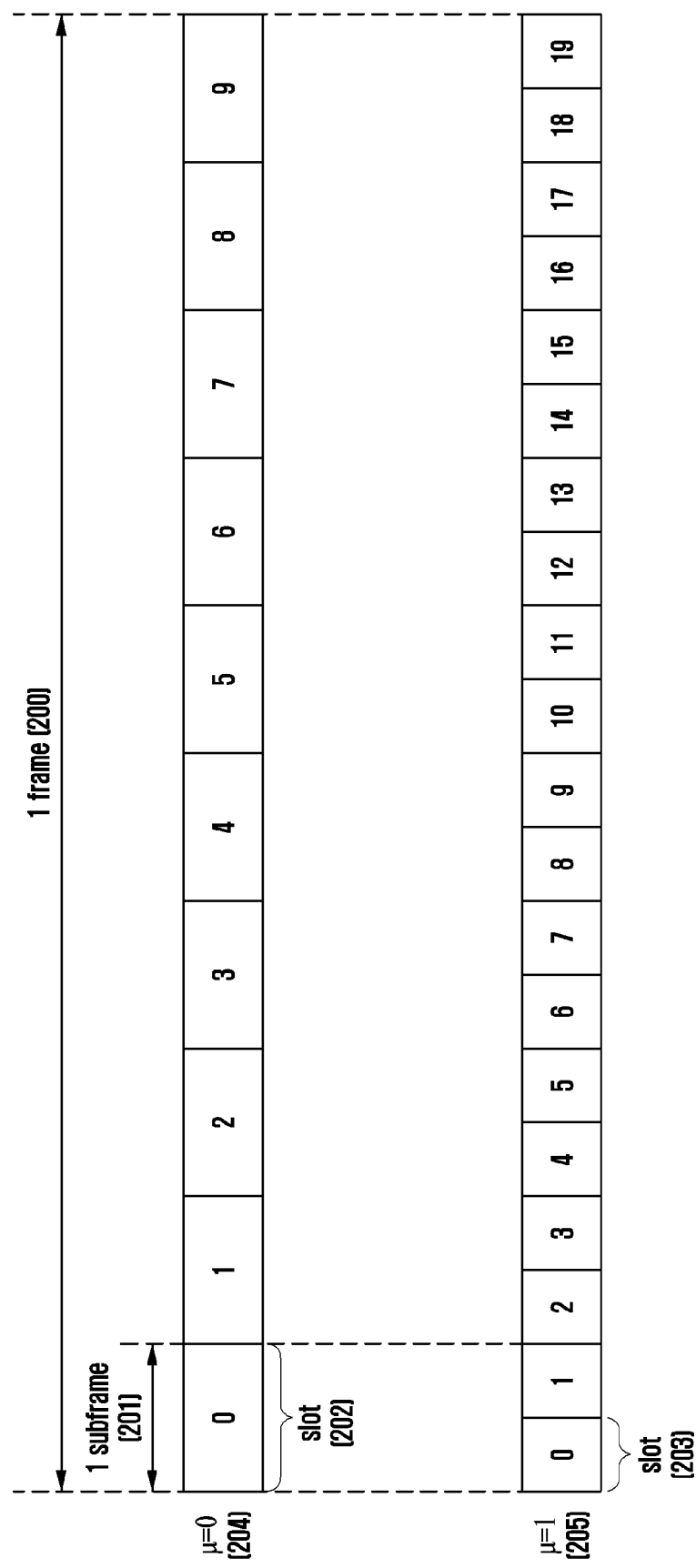
FIG. 2 illustrates a slot structure considered in a 5G system according to an embodiment of the disclosure.

FIG. 2 illustrates a slot structure considered in a 5G system according to an embodiment of the disclosure.

Referring to FIG. 2, an example of a structure of a frame 200, a subframe 201, and a slot 202 is illustrated. One frame 200 may be defined as 10 ms. One subframe 201 may be defined as 1 ms, and thus one frame 200 may be configured by a total of 10 subframes 201. One slot 202 or 203 may be defined as 14 OFDM symbols (i.e., the number of symbols for one slot ($N_{symb}^{slot}$=14)). One subframe 201 may include one or multiple slots 202 and 203, and the number of slots 202 and 203 per one subframe 201 may differ according to configuration value µ 204 or 205 for a subcarrier spacing.

In an example of FIG. 2, a case in which the subcarrier spacing configuration value is µ=0 (indicated by reference numeral 204) and µ=1 (indicated by reference numeral 205) is illustrated. In case that µ=0 (indicated by reference numeral 204), one subframe 201 may include one slot 202, and in case that µ=1 (indicated by reference numeral 205), one subframe 201 may include two slots 203. That is, the number of slots per one subframe ($N_{slot}^{subframe,\mu}$) may differ according to a subcarrier spacing configuration value µ, and accordingly, the number of slots per one frame ($N_{slot}^{frame,\mu}$) may differ. According to each subcarrier spacing configuration µ, $N_{slot}^{subframe,\mu}$ and $N_{slot}^{frame,\mu}$ may be defined in Table 1 below.

TABLE 1

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 170 | 17 |
| 5 | 14 | 320 | 32 |

Next, a demodulation reference signal (DMRS), which is one of reference signals in the 5G system, will be described in detail. The DMRS may include several DMRS ports, and each port maintains orthogonality by using code division multiplexing (CDM) or frequency division multiplexing (FDM) so as not to generate interference. However, the term "DMRS" may be expressed in other terms depending on a user's intention and the purpose of using the reference signal. More specifically, the term "DMRS" is merely provided for specific examples to easily explain the technical content of the disclosure and to help the understanding of the disclosure, and is not intended to limit the scope of the disclosure. That is, it is obvious to those skilled in the art to which the disclosure belongs that it can be implemented even with a reference signal based on the technical idea of the disclosure.

FIG. 3 illustrates DMRS patterns (type1 and type2) used for communication between a base station and a terminal in a 5G system according to an embodiment of the disclosure.

In a 5G system, two DMRS patterns may be supported. Two DMRS patterns are illustrated in detail in FIG. 3.

Referring to FIG. 3, reference numerals 301 and 302 represent DMRS type 1, where 301 represents a one-symbol pattern and 302 represents a two-symbol pattern. DMRS type 1 of 301 or 302 of FIG. 3 is a DMRS pattern of a comb 2 structure and may be configured by two CDM groups, and different CDM groups may be FDMed.

In the one-symbol pattern of 301 of FIG. 3, two DMRS ports may be distinguished by applying CDM in a frequency to the same CDM group, and thus a total of four orthogonal DMRS ports may be configured. DMRS port IDs respectively mapped to the CDM groups are illustrated in reference numeral 301 of FIG. 3 (in a case of downlink, the DMRS port ID is indicated by being +1000 to the illustrated number).

In the two-symbol pattern of reference numeral 302 of FIG. 3, four DMRS ports may be distinguished by applying CDM in time/frequency to the same CDM group, and thus a total of eight orthogonal DMRS ports may be configured. DMRS port IDs respectively mapped to the CDM groups are illustrated in reference numeral 302 of FIG. 3 (in a case of downlink, the DMRS port ID is indicated by being +1000 to the illustrated number).

DMRS type 2 of reference numeral 303 or 304 of FIG. 3 is a DMRS pattern of a structure in which frequency division-orthogonal cover code (FD-OCC) is applied to adjacent subcarriers in a frequency and may be configured by three CDM groups, and different CDM groups may be FDMed.

In the one-symbol pattern of 303 of FIG. 3, two DMRS ports may be distinguished by applying CDM in frequency to the same CDM group, and thus a total of six orthogonal DMRS ports may be configured. DMRS port IDs respectively mapped to the CDM groups are illustrated in reference numeral 303 of FIG. 3 (in a case of downlink, the DMRS port ID is indicated by being +1000 to the illustrated number).

In the two-symbol pattern of 304 of FIG. 3, four DMRS ports may be distinguished by applying CDM in time/ frequency to the same CDM group, and thus a total of 12 orthogonal DMRS ports may be configured. DMRS port IDs respectively mapped to the CDM groups are illustrated in reference numeral 304 of FIG. 3 (in a case of downlink, the DMRS port ID is indicated by being +1000 to the illustrated number).

As described above, in NR system, two different DMRS patterns (i.e., 301 and 302 or 303 and 304 of FIG. 3) may be configured, and whether the DMRS pattern is the one-symbol pattern (i.e., 301 and 303) or the adjacent two-symbol pattern (i.e., 302 and 304) may also be configured. In addition, in the NR system, not only a DMRS port number may be scheduled but also the number of CDM groups scheduled together for physical downlink shared channel (PDSCH) rate matching may be configured and signaled. Further, in case of cyclic prefix based orthogonal frequency division multiplex (CP)-OFDM, both the above-described two DMRS patterns may be supported in DL and UL, and in case of DFT-S-OFDM, only DMRS type 1 is supported among the above-described DMRS patterns in UL.

Further, an additional DMRS may be supported to be configurable. A front-loaded DMRS refers to a first DMRS that is located in the earliest symbol in time, and the additional DMRS refers to a DMRS that is located in a symbol after the front-loaded DMRS. In the NR system, the number of additional DMRSs may be configured from a minimum of zero to a maximum of three. In addition, the same pattern as that of the front-loaded DMRS may be assumed when an additional DMRS is configured.

More specifically, when information indicating whether the front-loaded DMRS is the above-described DMRS pattern type 1 or type 2, information indicating whether the DMRS pattern is the one-symbol pattern or the adjacent two-symbol pattern, and information on the number of CDM groups used with the DMRS port are indicated, in case that the additional DMRS is additionally configured, it may be assumed that the additional DMRS is configured with the same DMRS information as that of the front-loaded DMRS.

More specifically, the downlink DMRS configuration described above may be configured through RRC signaling as shown in Table 2 below.

TABLE 2

```
DMRS-DownlinkConfig ::= SEQUENCE {
    dmrs-Type ENUMERATED {type2}OPTIONAL, --
Need S
    dmrs-AdditionalPosition ENUMERATED {pos0, pos1, pos3}
OPTIONAL, -- Need S
    maxLength ENUMERATED {len2}OPTIONAL, -- Need S
        scramblingID0 INTEGER (0..65535) OPTIONAL, --
Need S
        scramblingID1 INTEGER (0..65535) OPTIONAL, --
Need S
    phaseTrackingRS SetupRelease { PTRS-DownlinkConfig }
OPTIONAL, -- Need M
    ...
}
```

In addition, the uplink DMRS configuration described above may be configured through RRC signaling as shown in Table 3 below.

TABLE 3

```
DMRS-UplinkConfig ::= SEQUENCE {
    dmrs-Type ENUMERATED {type2}
OPTIONAL, -- Need S
    dmrs-AdditionalPosition ENUMERATED {pos0, pos1, pos3}
OPTIONAL, -- Need R
    phaseTrackingRS SetupRelease { PTRS-UplinkConfig }
OPTIONAL, -- Need M
    maxLength ENUMERATED {len2}
OPTIONAL, -- Need S
    transformPrecodingDisabled SEQUENCE {
        scramblingID0 INTEGER (0..65535) OPTIONAL, -- Need
S
        scramblingID1 INTEGER (0..65535) OPTIONAL, -- Need
S
        ...
    } OPTIONAL, -- Need R
    transformPrecodingEnabled SEQUENCE {
        nPUSCH-Identity INTEGER(0..1007)
OPTIONAL, -- Need S
        sequenceGroupHopping ENUMERATED {disabled}OPTIONAL,
-- Need S
```

TABLE 3-continued

```
        sequenceHopping ENUMERATED {enabled}OPTIONAL,
-- Need S
        ...
    }OPTIONAL, -- Need R
    ...
}
```

Figure 4:
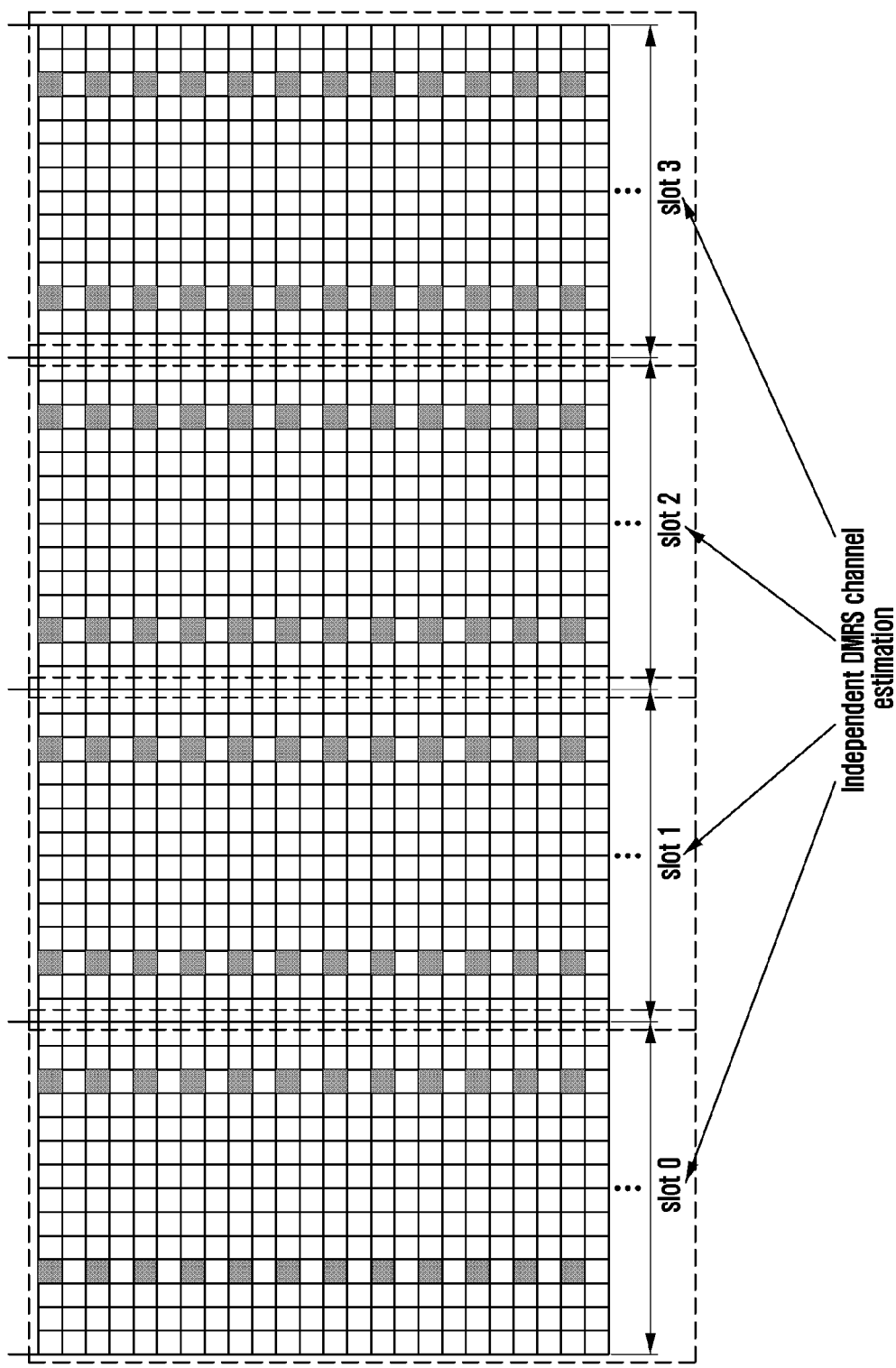
FIG. 4 illustrates an example of channel estimation using DMRS received through one PUSCH in a time band in a 5G system according to an embodiment of the disclosure.

FIG. 4 illustrates an example of channel estimation using DMRS received through one PUSCH in a time band in a 5G system according to an embodiment of the disclosure.

Referring to FIG. 4, in connection with performing channel estimation for data decoding using the above-described DMRS, in a frequency band, channel estimation may be performed within a precoding resource block group (PRG), which is a corresponding bundling unit, by using bundling of physical resource blocks (PRBs) linked to a system band. In addition, in a time unit, channel estimation may be performed under an assumption that only DMRS received through a single PUSCH has the same precoding.

Hereinafter, a method for time domain resource allocation for a data channel in a 5G communication system will be described. A base station may configure, for a UE, a table for time-domain resource allocation information for a downlink data channel (PDSCH) and an uplink data channel (PUSCH) via higher layer signaling (e.g., RRC signaling).

The base station may configure, with regard to PDSCH, a table including up to maxNrofDL-Allocations=17 entries, and may configure, with regard to PUSCH, a table including up to maxNrofUL-Allocations=17 entries. The time-domain resource allocation information may include PDCCH-to-PDSCH slot timing (corresponding to a time interval in slot units between a time point at which a PDCCH is received and a time point at which a PDSCH scheduled by the received PDCCH is transmitted, and marked as K0), PDCCH-to-PUSCH slot timing (corresponding to a time interval in slot units between a time point at which a PDCCH is received and a time point at which a PUSCH scheduled by the received PDCCH is transmitted, and denoted by K2), information on the position and length of a start symbol in which the PDSCH or PUSCH is scheduled within a slot, a mapping type of PDSCH or PUSCH, and the like. For example, time domain resource allocation information with regard to the PDSCH may be configured for the UE through an RRC signal as shown in Table 4 below.

TABLE 4

```
PDSCH-TimeDoinainResoureeAllocationList information element
PDSCH-TimeDomainResourceAllocationList ::= SEQUENCE
(SIZE(1..maxNrofDL-Allocations)) OF PDSCH-
TimeDomainResourceAllocation
PDSCH-TimeDomainResourceAllocation ::= SEQUENCE {
    k0                   INTEGER(0..32)  OPTIONAL, -- Need S
    mappingType          ENUMERATED {typeA, typeB},
    startSymbolAndLength INTEGER (0..127)}
```

For example, time domain resource allocation information with regard to the PUSCH may be configured for the UE through an RRC signal as shown in Table 5 below.

TABLE 5

```
PUSCH-TimeDomainResoureeAllocation information element
PUSCH-TimeDomainResourceAllocationList ::= SEQUENCE
(SIZE(1..maxNrofUL-Allocations)) OF PUSCH-
TimeDomainResourceAllocation
PUSCH-TimeDomainResourceAllocation ::= SEQUENCE {
```

TABLE 5-continued

```
k2                      INTEGER(0..32)   OPTIONAL, -- Need S
mappingType             ENUMERATED {typeA, typeB},
startSymbolAndLength    INTEGER (0..127)
}
```

The base station may transmit one of the entries in the table representing the time-domain resource allocation information to the UE via L1 signaling (e.g., downlink control information (DCI)) (e.g., may be indicated by a "time-domain resource allocation" field in DCI). The UE may acquire time-domain resource allocation information for the PDSCH or PUSCH based on the DCI received from the base station.

Hereinafter, transmission of an uplink data channel (PUSCH) in a 5G system will be described in detail. PUSCH transmission may be dynamically scheduled by a UL grant in DCI or may be performed by a configured grant Type 1 or configured grant Type 2. Dynamic scheduling for PUSCH transmission may be indicated by DCI format 0_0 or 0_1.

The configured grant Type 1 PUSCH transmission may be semi-statically configured through reception of configuredGrantConfig including rrc-ConfiguredUplinkGrant of Table 6 via higher layer signaling rather than being configured through a UL grant in DCI. The configured grant Type 2 PUSCH transmission may be semi-persistently scheduled by UL grant in DCI after reception of configuredGrantConfig not including the rrc-ConfiguredUplinkGrant of Table 6 via higher layer signaling. When PUSCH transmission is performed by a configured grant, parameters applied to PUSCH transmission may be applied through configuredGrantConfig, which is higher layer signaling of Table 6, except for specific parameters (e.g., dataScramblingIdentityPUSCH, txConfig, codebookSubset, maxRank, scaling of UCI-OnPUSCH, etc.) provided by pusch-Config of Table 7, which is higher layer signaling. For example, when the UE is provided with transformPrecoder in configuredGrantConfig, which is higher layer signaling of Table 6, the UE may apply tp-pi2BPSK in the pusch-Config of Table 7 with regard to PUSCH transmission operated by the configured grant.

TABLE 6

ConfiguredGrantConfig

```
ConfiguredGrantConfig ::=                          SEQUENCE {
  frequencyHopping                                 ENUMERATED {intraSlot, interSlot}
OPTIONAL, -- Need S,
  cg-DMRS-Configuration                            DMRS-UplinkConfig,
  mcs-Table                                        ENUMERATED {qam256, qam64LowSE}
OPTIONAL, -- Need S
  mcs-TableTransformPrecoder                       ENUMERATED {qam256, qam64LowSE}
OPTIONAL, -- Need S
  uci-OnPUSCH                                      SetupRelease {CG-UCI-OnPUSCH }
OPTIONAL, -- Need M
  resourceAllocation                               ENUMERATED {resourceAllocationTypeO,
resourceAllocationType1, dynamicSwitch },
  rbg-Size                                         ENUMERATED {config2}
OPTIONAL, -- Need S
  powerControlLoopToUse                            ENUMERATED {n0, n1},
  p0-PUSCH-Alpha                                   PO-PUSCH-AlphaSetId,
  transformPrecoder                                ENUMERATED {enabled, disabled}
OPTIONAL, -- Need S
  nrofHARQ-Processes                               INTEGER(1..17),
  repK                                             ENUMERATED {n1, n2, n4, n8},
  repK-RV                                          ENUMERATED {s1-0231, s2-0303, s3-0000}
OPTIONAL, -- Need R
  periodicity                                      ENUMERATED {
                                                     sym2, sym7, sym1x14, sym2x14, sym4x14, sym5x14,
sym8x14, sym10x14, sym17x14, sym20x14,
                                                     sym32x14, sym40x14, sym64x14, sym80x14, sym128x14,
sym170x14, sym256x14, sym320x14, sym512x14,
                                                     sym640x14, sym1024x14, sym1280x14, sym2560x14,
sym5120x14,
                                                     sym6, sym1x12, sym2x12, sym4x12, sym5x12, sym8x12,
sym10x12, sym17x12, sym20x12, sym32x12,
                                                     sym40x12, sym64x12, sym80x12, sym128x12,
sym170x12, sym256x12, sym320x12, sym512x12, sym640x12,
                                                     sym1280x12, sym2560x12
  },
  configuredGrantTimer                             INTEGER (1..64)
OPTIONAL, -- Need R
  rrc-ConfiguredUplinkGrant                        SEQUENCE {
    timeDomainOffset                               INTEGER (0..5119),
    timeDomainAllocation                           INTEGER (0..16),
    frequencyDomainAllocation                      BIT STRING (SIZE(18)),
    antennaPort                                    INTEGER (0..31),
    dmrs-SeqInitialization                         INTEGER (0..1)
OPTIONAL, -- Need R
    precodingAndNumberOfLayers                     INTEGER (0..63),
    srs-ResourceIndicator                          INTEGER (0..16)
OPTIONAL, -- Need R
    mcsAndTBS                                      INTEGER (0..31),
    frequencyHoppingOffset                         INTEGER (1..
maxNrofPhysicalResourceBlocks-1)                   OPTIONAL, -- Need R
    pathlossReferenceIndex                         INTEGER (0..maxNrofPUSCH-
```

TABLE 6-continued

ConfiguredGrantConfig

PathlossReferenceRSs-1),
    ...
    }                                         OPTIONAL, --
Need R
    ...
}

Next, a PUSCH transmission method will be described. A DMRS antenna port for PUSCH transmission may be the same as an antenna port for SRS transmission. PUSCH transmission may be based on a codebook-based transmission method and a non-codebook-based transmission method, respectively, depending on whether the value of txConfig in pusch-Config of Table 7, which is higher layer signaling, is "codebook" or "nonCodebook". As described above, PUSCH transmission may be dynamically scheduled through DCI format 0_0 or 0_1, and may be semi-statically configured by a configured grant.

When the UE is indicated to schedule PUSCH transmission through DCI format 0_0, the UE may perform beam configuration for PUSCH transmission by using pucch-spatialRelationInfoID corresponding to the UE-specific (UE-dedicated) PUCCH resource having the lowest ID in a uplink bandwidth part (BWP) activated in a serving cell. PUSCH transmission may occur based on a single antenna port. The UE does not expect scheduling for PUSCH transmission through DCI format 0_0 within a BWP in which the PUCCH resource including the pucch-spatialRelationInfo is not configured. When the UE is not configured with txConfig in pusch-Config of Table 7, the UE may not be expected to be scheduled by DCI format 0_1.

TABLE 7

PUSCH-Config

PUSCH-Config ::= SEQUENCE {
    dataScramblingIdentityPUSCH INTEGER (0..1023) OPTIONAL,
-- Need S
    txConfig ENUMERATED {codebook, nonCodebook}
OPTIONAL, -- Need S
    dmrs-UplinkForPUSCH-MappingTypeA SetupRelease
{ DMRS-UplinkConfig }
OPTIONAL, -- Need M
    dmrs-UplinkForPUSCH-MappingTypeB SetupRelease
{ DMRS-UplinkConfig }
OPTIONAL, -- Need M
    pusch-PowerControl PUSCH-PowerControl OPTIONAL,
-- Need M
    frequencyHopping ENUMERATED {intraSlot, interSlot}
OPTIONAL, -- Need S
    frequencyHoppingOffsetLists SEQUENCE (SIZE (1..4)) OF
INTEGER (1..
maxNrofPhysicalResourceBlocks-1) OPTIONAL, --
Need M
    resourceAllocation ENUMERATED {resourceAllocationType0,
resourceAllocationType1, dynamicSwitch},
    pusch-TimeDomainAllocationList SetupRelease {PUSCH-
TimeDomainResourceAllocationList } OPTIONAL, -- Need M
    pusch-AggregationFactor ENUMERATED { n2, n4, n8 }
OPTIONAL, --
Need S
    mcs-Table ENUMERATED {qam256, qam64LowSE}
OPTIONAL, --
Need S
    mcs-TableTransformPrecoder ENUMERATED
{qam256, qam64LowSE}
OPTIONAL, -- Need S
    transformPrecoder ENUMERATED {enabled, disabled}

TABLE 7-continued

PUSCH-Config

OPTIONAL, -- Need S
    codebookSubset ENUMERATED
{fullyAndPartialAndNonCoherent,
partialAndNonCoherent,nonCoherent}
        OPTIONAL, -- Cond codebookBased
    maxRank INTEGER (1..4) OPTIONAL, -- Cond codebookBased
    rbg-Size ENUMERATED { config2} OPTIONAL, --
Need S
    uci-OnPUSCH SetupRelease {UCI-OnPUSCH} OPTIONAL,
-- Need M
    tp-pi2BPSK ENUMERATED {enabled} OPTIONAL, --
Need S
    ...
}

Next, codebook-based PUSCH transmission will be described. Codebook-based PUSCH transmission may be dynamically scheduled through DCI format 0_0 or 0_1, and may be configured to semi-static by a configured grant. When the codebook-based PUSCH is dynamically scheduled by DCI format 0_1 or is configured semi-statically by a configured grant, the UE may determine a precoder for PUSCH transmission based on an SRS resource indicator (SRI), a transmission precoding matrix indicator (TPMI), and a transmission rank (the number of PUSCH transport layers). The SRI may be configured through a field SRS resource indicator in DCI or may be configured through srs-ResourceIndicator, which is higher layer signaling. The UE may be configured with at least one SRS resource during codebook-based PUSCH transmission, and may be configured with up to two SRS resources for example. When the UE is provided with an SRI through DCI, an SRS resource indicated by the corresponding SRI may denote an SRS resource corresponding to the SRI among SRS resources transmitted before a PDCCH including the corresponding SRI. In addition, the TPMI and transmission rank may be configured through field precoding information and number of layers in DCI, or may be configured through precodingAndNumberOfLayers, which is higher layer signaling. The TPMI may be used to indicate a precoder applied to PUSCH transmission.

A precoder to be used for PUSCH transmission may be selected from an uplink codebook having the same number of antenna ports as the value of nrofSRS-Ports in SRS-Config, which is higher layer signaling. In codebook-based PUSCH transmission, the UE may determine a codebook subset based on the TPMI and codebookSubset in pusch-Config, which is higher layer signaling. The codebookSubset in pusch-Config, which is higher layer signaling, may be configured as one of "fullyAndPartialAndNonCoherent", "partialAndNonCoherent", or "nonCoherent" based on UE capability reported by the UE to the base station.

When the UE has reported "partialAndNonCoherent" via UE capability, the UE may not expect that the value of codebookSubset, which is higher layer signaling, is configured as "fullyAndPartialAndNonCoherent". In addition, when the UE has reported "nonCoherent" via UE capability, the UE may not expect that the value of codebookSubset, which is higher layer signaling, is configured as "fullyAndPartialAndNonCoherent" or "partialAndNonCoherent". When nrofSRS-Ports in SRS-ResourceSet, which is higher layer signaling, indicates two SRS antenna ports, the UE may not expect that the value of codebookSubset, which is higher layer signaling, is configured as "partialAndNonCoherent".

The UE may be configured with one SRS resource set in which the value of usage in the SRS-ResourceSet, which is higher layer signaling, is configured as "codebook", and one SRS resource in the corresponding SRS resource set may be indicated through the SRI. If multiple SRS resources are configured in the SRS resource set in which the value of usage in the SRS-ResourceSet, which is higher layer signaling, is configured as "codebook", the UE may expect that the values of nrofSRS-Ports in the SRS-Resource, which is higher layer signaling, are configured to be the same value with respect to all SRS resources.

The UE may transmit, to the base station, one or multiple SRS resources included in the SRS resource set in which the value of usage is configured as "codebook" according to higher layer signaling. The base station may select one of the SRS resources transmitted by the UE, and may instruct the UE to perform PUSCH transmission by using transmission beam information of the corresponding SRS resource. In the codebook-based PUSCH transmission, the SRI may be used as information for selection of the index of one SRS resource, and may be included in the DCI. Additionally, the base station may include, in the DCI, information indicating a rank and a TPMI to be used by the UE for PUSCH transmission, and may transmit the same. The UE may perform PUSCH transmission by applying a precoder indicated by a rank and a TPMI indicated based on the transmission beam of the SRS resource, by using the SRS resource indicated by the SRI.

Next, non-codebook-based PUSCH transmission will be described. Non-codebook-based PUSCH transmission may be dynamically scheduled through DCI format 0_0 or 0_1, and may be configured to semi-static by a configured grant. When at least one SRS resource is configured in an SRS resource set in which the value of usage in the SRS-ResourceSet, which is higher layer signaling, is configured as "nonCodebook", the UE may be scheduled with non-codebook-based PUSCH transmission through DCI format 0_1.

With regard to an SRS resource set in which the value of usage in the SRS-ResourceSet, which is higher layer signaling, is configured as "nonCodebook", the UE may be configured with a non-zero power (NZP) CSI-RS resource, which is associated with one SRS resource set. The UE may perform calculation of a precoder for SRS transmission by measuring the NZP CSI-RS resource configured in association with the SRS resource set. When the difference between the last received symbol of an aperiodic NZP CSI-RS resource associated with the SRS resource set and the first symbol of aperiodic SRS transmission in the UE is less than a specific symbol (e.g., 42 symbols), the UE may not expect information on the precoder for SRS transmission to be updated.

When the value of resourceType in the SRS-ResourceSet, which is higher layer signaling, is configured to be "aperiodic", the NZP CSI-RS associated with the SRS-ResourceSet may be indicated by SRS request, which is a field in DCI format 0_1 or 1_1. A case in which the NZP CSI-RS resource associated with the SRS-ResourceSet is an aperiodic NZP CSI-RS resource and the value of the field SRS request in DCI format 0_1 or 1_1 is not '00' may indicate that the NZP CSI-RS associated with the SRS-ResourceSet exists. The DCI should not indicate cross carrier or cross BWP scheduling. In addition, when the value of the SRS request indicates the existence of the NZP CSI-RS, the corresponding NZP CSI-RS may be located in a slot in which a PDCCH including the SRS request field is transmitted. TCI states configured via the scheduled subcarrier may not be configured to be QCL-TypeD.

If a periodic or semi-persistent SRS resource set is configured, the NZP CSI-RS associated with the SRS resource set may be indicated through associated CSI-RS in the SRS-ResourceSet, which is higher layer signaling. With regard to non-codebook-based transmission, the UE may not expect that spatialRelationInfo, which is higher layer signaling for SRS resource, and associated CSI-RS in SRS-ResourceSet, which is higher layer signaling, are configured together.

When the UE is configured with multiple SRS resources, the UE may determine a precoder to be applied to PUSCH transmission and a transmission rank, based on the SRI indicated by the base station. The SRI may be configured through a field SRS resource indicator in DCI or may be configured through srs-ResourceIndicator, which is higher layer signaling. As in the above-described codebook-based PUSCH transmission, when the UE is provided with an SRI through DCI, an SRS resource indicated by the SRI may denote an SRS resource corresponding to the SRI among SRS resources transmitted before the PDCCH including the SRI. The UE may use one or multiple SRS resources for SRS transmission, and the maximum number of SRS resources capable of simultaneous transmission from the same symbol in one SRS resource set may be determined by UE capability reported by the UE to the base station. The SRS resources simultaneously transmitted by the UE may occupy the same RB. The UE may configure one SRS port for each SRS resource. Only one SRS resource set in which the value of usage in the SRS-ResourceSet, which is higher layer signaling, is configured to be "nonCodebook" may be configured, and up to four SRS resources for non-codebook-based PUSCH transmission may be configured.

The base station may transmit one NZP-CSI-RS associated with the SRS resource set to the UE, and the UE may perform calculation of a precoder to be used for transmission of one or multiple SRS resources in the corresponding SRS resource set based on a result of measurement of the NZP-CSI-RS. The UE may apply the calculated precoder when transmitting, to the base station, one or multiple SRS resources in the SRS resource set in which usage is configured to be "nonCodebook", and the base station may select one or multiple SRS resources among the received one or multiple SRS resources. In non-codebook-based PUSCH transmission, the SRI may indicate an index capable of expressing one or a combination of multiple SRS resources, and the SRI may be included in the DCI. The number of SRS resources indicated by the SRI transmitted by the base station may be the number of transmission layers of the PUSCH, and the UE may perform PUSCH transmission by applying a precoder applied for SRS resource transmission to each layer.

Next, PUSCH repetitive transmission will be described. When the UE is scheduled with PUSCH transmission through DCI format 0_1 in a PDCCH including CRC scrambled by C-RNTI, MCS-C-RNTI, or CS-RNTI, if the UE is configured with higher layer signaling pusch-AggregationFactor, the same symbol allocation may be applied in consecutive slots equal to the pusch-AggregationFactor, and PUSCH transmission may be limited to single rank transmission. For example, the UE should repeatedly transmit the same transport block (TB) in consecutive slots equal to pusch-AggregationF actor, and should apply the same symbol allocation to each slot. Table 8 shows the redundancy version applied to PUSCH repetitive transmission for each slot. If the UE is scheduled with PUSCH repetitive transmission in DCI format 0_1 in multiple slots, and if at least one symbol, in the slots in which PUSCH repetitive transmission is performed according to information of higher layer signaling tdd-UL-DL-ConfigurationCommon or tdd-UL-DL-ConfigurationDedicated, is indicated as a downlink symbol, the UE may not perform PUSCH transmission in a slot in which the corresponding symbol is located.

TABLE 8

| $rv_{id}$ indicated by the DCI scheduling the PUSCH | $rv_{id}$ to be applied to $n^{th}$ transmission occasion | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Hereinafter, repetitive transmission of an uplink data channel (PUSCH) in a 5G system will be described in detail. In the 5G system, two types of repetitive transmission methods of the uplink data channel are supported: PUSCH repetition type A and PUSCH repetition type B. The UE may be configured with one of PUSCH repetition types A and B via higher layer signaling.

PUSCH Repetition Type A

As described above, the start symbol and the symbol length of the PUSCH are determined in one slot by a time-domain resource allocation method, and a base station may transmit the number of repetitive transmissions to a UE via higher layer signaling (e.g., RRC signaling) or L1 signaling (e.g., DCI).

The UE may perform repetitive transmission, in consecutive slots, of a PUSCH having the same start symbol and length as that of the configured PUSCH, based on the number of repetitive transmissions received from the base station. If at least one symbol among symbols in a slot configured for downlink by the base station to the UE or in a slot for PUSCH repetitive transmission configured for the UE is configured for downlink, the UE may omit PUSCH transmission in the corresponding slot. That is, the UE may not perform PUSCH transmission although it is included in the number of PUSCH repetitive transmissions.

PUSCH Repetition Type B

As described above, the start symbol and length of the PUSCH are determined in one slot by the time-domain resource allocation method, and the base station may transmit the number of repetitive transmissions (numberofrepetitions) to the UE via higher layer signaling (e.g., RRC signaling) or L1 signaling (e.g., DCI).

Based on the start symbol and length of the configured PUSCH, nominal repetition of the PUSCH may be determined as follows. Nominal repetition may refer to a resource of a symbol configured by the base station for PUSCH repetitive transmission, and the UE may determine a resource usable for uplink in the configured nominal repetition. A slot in which the nth nominal repetition starts may be given by $$K_s + \left\lfloor \frac{S + n \cdot L}{N_{symb}^{slot}} \right\rfloor,$$

and a symbol from which nominal repetition starts in the start slot lot may be given by $\mathrm{mod}(S+n \cdot L, N_{symb}^{slot})$. A slot in which the nth nominal repetition ends may be given by $$K_s + \left\lfloor \frac{S + (n+1) \cdot L - 1}{N_{symb}^{slot}} \right\rfloor,$$

and a symbol from which nominal repetition ends in the last slot may be given by $\mathrm{mod}(S+(n+1) \cdot L-1, N_{symb}^{slot})$. Here, n=0, . . . , number of repetitions–1, S may indicate the start symbol of the configured PUSCH, and L may indicate the symbol length of the configured PUSCH. $K_s$ may indicate a slot in which PUSCH transmission starts, and $N_{symb}^{slot}$ may denote the number of symbols for one slot.

The UE determines an invalid symbol for PUSCH repetition type B. A symbol configured for downlink by tdd-UL-DL-ConfigurationCommon or tdd-UL-DL-ConfigurationDedicated may be determined as an invalid symbol for PUSCH repetition type B. Additionally, an invalid symbol may be configured based on a higher layer parameter (e.g., InvalidSymbolPattern). As an example, the higher layer parameter (e.g., InvalidSymbolPattern) may provide a symbol-level bitmap spanning one or two slots so that invalid symbols may be configured. In the bitmap, "1" represents an invalid symbol. Additionally, the period and pattern of the bitmap may be configured through a higher layer parameter (e.g., periodicityAndPattern). If a higher layer parameter (e.g., InvalidSymbolPattern) is configured and InvalidSymbolPatternIndicator-ForDCIFormat0_1 or InvalidSymbolPatternIndicator-ForDCIFormat0_2 parameter indicates 1, the UE may apply an invalid symbol pattern, and if the parameter indicates 0, the UE may not apply the invalid symbol pattern. If a higher layer parameter (e.g., InvalidSymbolPattern) is configured and the InvalidSymbolPatternIndicator-ForDCIFormat0_1 or InvalidSymbolPatternIndicator-ForDCIFormat0_2 parameter is not configured, the UE may apply an invalid symbol pattern.

After the invalid symbol is determined in each nominal repetition, the UE may consider symbols except for the determined invalid symbol as valid symbols. If one or more valid symbols are included in each nominal repetition, the nominal repetition may include one or more actual repetitions. Each actual repetition may refer to a symbol actually used for PUSCH repetitive transmission among symbols configured by the nominal repetition, and may include a consecutive set of valid symbols that can be used for PUSCH repetition type B in one slot. The UE may omit transmission of the actual repetition when the actual repetition with one symbol is configured as valid except for a case in which the symbol length L=1 of the configured PUSCH. A redundancy version is applied according to a redundancy version pattern configured for each nth actual repetition.

Figure 5:
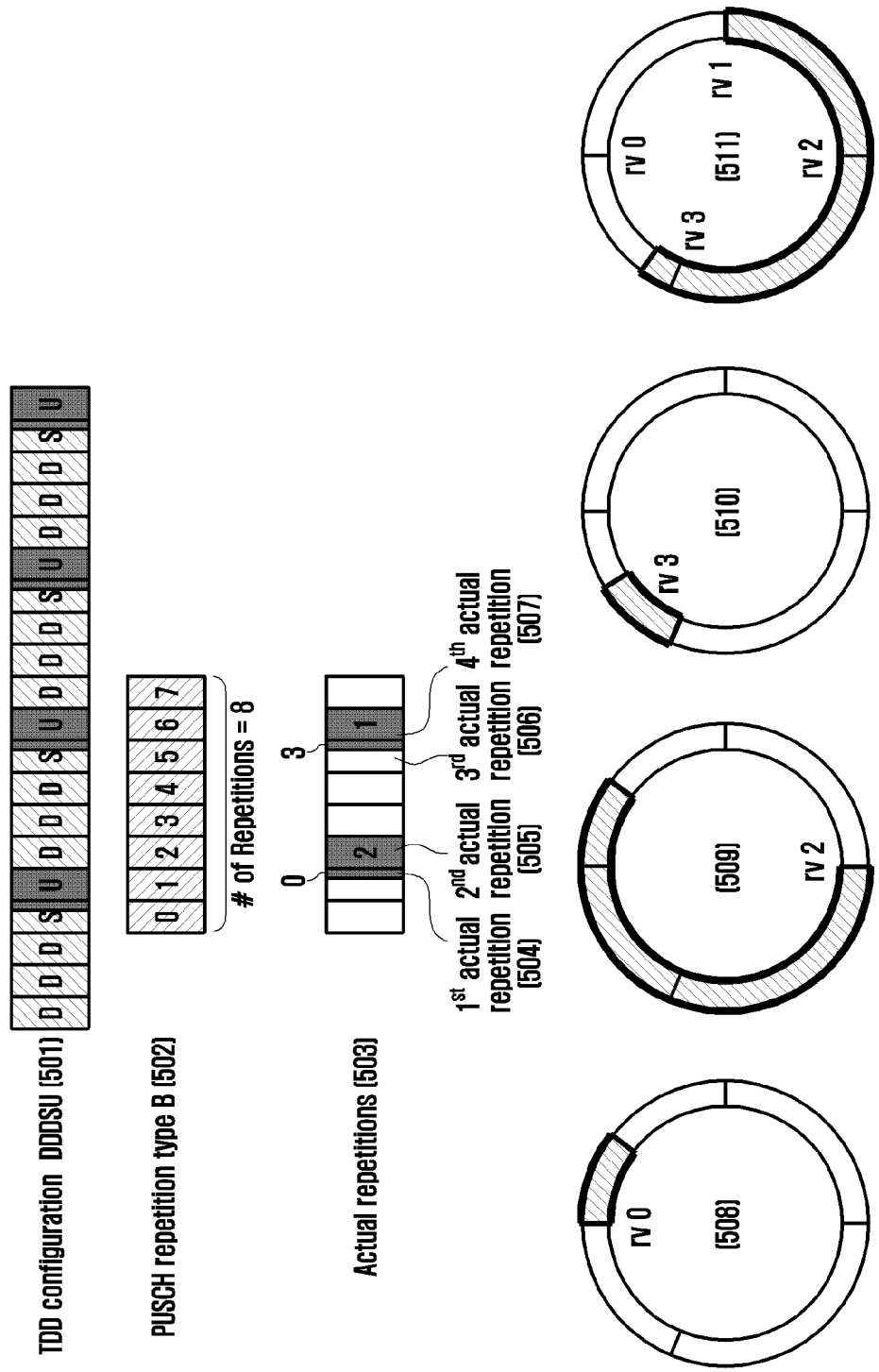
FIG. 5 illustrates an example of PUSCH repetition type B in a 5G system according to an embodiment of the disclosure.

FIG. 5 illustrates an example of PUSCH repetition type B in a 5G system according to an embodiment of the disclosure.

Referring to FIG. 5, a UE may be configured with the frame structure configuration of time division duplexing (TDD) of 3 downlink slots, 1 special/flexible slot, and 1 uplink slot. When the special/flexible slot may be configured by 11 downlink symbols and 3 uplink symbols, the initial transmission slot corresponds to the 3rd in the second uplink transmission. When the UE may be configured with the uplink data channel having a start symbol index of 0, the uplink data channel length of 14, and the number of repetitive transmissions begin configured as repK=8, nominal repetition is indicated in 8 consecutive slots from the initial transmission slot (indicated by reference numeral 502). Thereafter, the UE determines a symbol, which is configured as a downlink symbol in the frame structure 501 of the TDD system in each nominal repetition, as an invalid symbol, and when the valid symbols are configured by one or more consecutive symbols in one slot, the valid symbols may be configured as actual repetition and transmitted (indicated by reference numeral 503). Accordingly, a total of repK_actual=4 PUSCHs may be actually transmitted. When repK-RV is configured as 0-2-3-1, the RV in the PUSCH of a first resource 504 for actual transmission is 0, and the RV in the PUSCH of a second resource 505 for actual transmission is 2, the RV in the PUSCH of a third resource 506 for actual transmission is 3, and the RV in the PUSCH of a fourth resource 507 for actual transmission is 1. Only the PUSCH having the RV value of 0 and the RV value of 3 has a value that can be decoded by itself. In a case of the first resource 504 and the third resource 506, the PUSCH transmission occurs only in three symbols, the symbol length of which are much smaller than the actual configured length of symbols (14 symbols), and thus bit lengths 508 and 510 subject to rate matching are smaller than bit lengths 509 and 511 calculated by the configuration.

Hereinafter, frequency hopping of an uplink data channel (physical uplink shared channel; PUSCH) in a 5G system will be described in detail.

In the 5G system, as a method for frequency hopping of an uplink data channel, two methods are supported for each PUSCH repetition type. First, PUSCH repetition type A supports intra-slot frequency hopping and inter-slot frequency hopping.

The intra-slot frequency hopping method supported by PUSCH repetition type A is a method in which a UE changes resources allocated in the frequency domain by a configured frequency offset in two hops within one slot and transmits the same. In intra-slot frequency hopping, start RB of each hop may be expressed through Equation 1.

$$RB_{start} = \begin{cases} RB_{start} & i = 0 \\ (RB_{start} + RB_{offset}) \bmod N_{BWP}^{ste} & i = 1 \end{cases} \quad \text{Equation 1}$$

In Equation 1, i=0 and i=1 indicate the first hop and the second hop, respectively, and $RB_{start}$ indicates a start RB in a UL BWP and is calculated from a frequency resource allocation method. $RB_{offset}$ indicates a frequency offset between two hops configured through a higher layer parameter. The number of symbols of the first hop may be represented by $$\lfloor N_{symb}^{PUSCH,s}/2 \rfloor,$$

and the number of symbols of the second hop may be represented by $$N_{symb}^{PUSCH,s} - \lfloor N_{symb}^{PUSCH,s}/2 \rfloor.$$

$N_{symb}^{PUSCH,s}$ is the length of PUSCH transmission in one slot, and may be represented by the number of OFDM symbols.

Next, an inter-slot frequency hopping method supported by the PUSCH repetition types A and B is a method in which a UE changes resources allocated in the frequency domain for each slot by a configured frequency offset and transmits the same. In the inter-slot frequency hopping, a start RB during $n_s^\mu$ slot may be expressed by Equation 2.

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases} \quad \text{Equation 2}$$

In Equation 2, $n_s^\mu$ indicates a current slot number in multi-slot PUSCH transmission, and $RB_{start}$ indicates a starting RB in a UL BWP and is calculated from the frequency resource allocation method. $RB_{offset}$ indicates a frequency offset between two hops configured through a higher layer parameter.

Next, an inter-repetition frequency hopping method supported by the PUSCH repetition type B is a method for moving, by a configured frequency offset, resources allocated in the frequency domain for one or a plurality of actual repetitions within each nominal repetition and transmitting the same. $RB_{start}(n)$, which is the index of the start RB on the frequency domain for one or a plurality of actual repetitions in the nth nominal repetition, may follow Equation 3 below.

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases} \quad \text{Equation 3}$$

In Equation 3, n denotes an index of nominal repetition, and $RB_{offset}$ denotes an RB offset between two hops configured through a higher layer parameter.

Hereinafter, a process in which a transport block (TB) is divided into several code blocks (CB) and CRC is added thereto in the 5G communication system will be described in detail.

Figure 6:
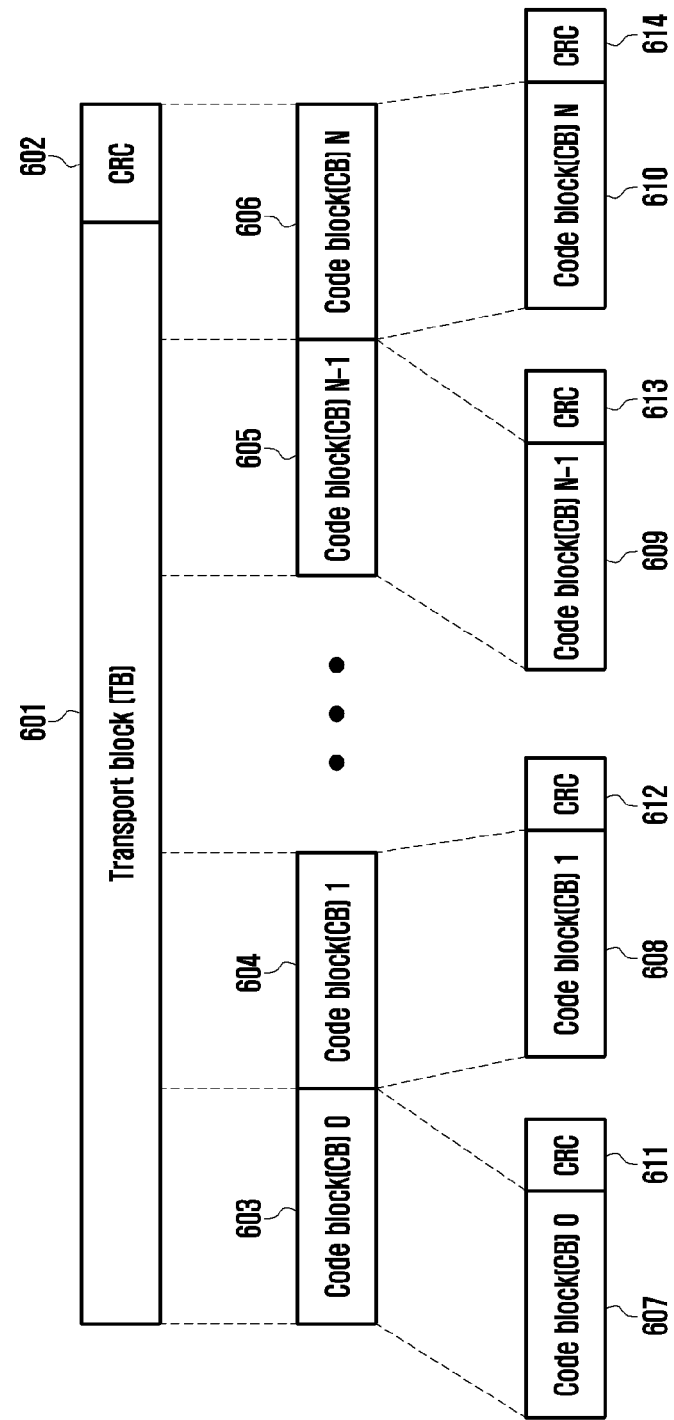
FIG. 6 illustrates an example of a process in which one transport block (TB) is divided into a plurality of code blocks and a CRC is added thereto in a 5G communication system according to an embodiment of the disclosure.

FIG. 6 illustrates an example of a process in which a transport block (TB) is divided into a plurality of code blocks (CBs) and a CRC is added thereto in a 5G communication system according to an embodiment of the disclosure.

Referring to FIG. 6, a CRC 602 may be added to the last part or the first part of one transport block (TB) 601 to be transmitted in an uplink or a downlink. The CRC 602 may have 17 bits, 25 bits, or a fixed number of bits, or may have a variable number of bits depending on channel conditions, and may be used to determine whether channel coding is successful. A block obtained by adding the CRC 602 to the TB 601 may be divided into a plurality of code blocks (CBs) 603, 604, 605, and 606. The divided code blocks (CBs) may have a predetermined maximum size, and in this case, the last code block (CB) 606 may be smaller in size than those of other code blocks 603, 604, and 605. This is only given as an example, and according to another example, the last code block (CB) 606 may have a length adjusted to be the same as that of the other code blocks 603, 604, and 605 by adding zeros, random values, or ones into the last code block (CB) 606. In addition, CRCs 611, 612, 613, and 614 may be added to the code blocks (CBs) 607, 608, 609, and 610, respectively. The CRC may have 17 bits, 24 bits, or a fixed number of bits, and may be used to determine whether channel coding is successful. The TB 601 and cyclic generator polynomial may be used in order to generate the CRC 602, and the cyclic generator polynomial may be defined in various methods. For example, if it is assumed that cyclic generator polynomial gCRC24A (D)=D24+D23+D18+D17+D14+D11+D10+D7+D6+D5+D4+D3+D+1 for a 24 bit CRC, and L=24, with regard to TB data $a_0, a_1, a_2, a_3, \ldots, a_{A-1}$, CRC $p_1, p_2, \ldots, p_{L-1}$ may be a value in which the remainder becomes zero by dividing $_0D^{A+23}+a_1D^{A+22}+ \ldots +a_{A-1}D^{24}+p_0D^{23}+p_1D^{22}+ \ldots +p_{22}D^1+p_{23}$ by gCRC24A(D), and may determine $p_1, p_2, \ldots, p_{L-1}$. In the above example, the CRC length "L" is assumed to be 24 as an example, but the CRC length L may be determined to have different lengths, such as 12, 17, 24, 32, 40, 48, 64, and the like.

Through this process, the CRC is added to the TB, and then the TB having CRC added thereto (TB+CRC) may be divided into N CBs 603, 604, 605, and 606. CRCs 611, 612, 613, and 614 may be added to each of the divided CBs 603, 604, 605, and 606. The CRC added to the CB may have a different length than that of the CRC added to the TB or may use a different cyclic generator polynomial to generate CRC. In addition, the CRC 602 added to the TB and the CRCs 611, 612, 613, and 614 added to the code block (CB) may be omitted depending on the type of a code block (CB) type to be applied to the code block (CB). For example, if LDPC codes other than turbo codes are applied to code blocks (CBs), CRCs 611, 612, 613, and 614 to be inserted for each code block may be omitted. However, even if the LDPC is applied, the CRCs 611, 612, 613, and 614 may be added to the code block as it is. In addition, CRC may be added or omitted even if a polar code is used. As described above in FIG. 6, the maximum length of one code block (CB) is determined according to the type of applied channel coding, and with regard to a TB to be transmitted, the TB and CRC, which is added to the TB, are divided into code blocks according to the maximum length of the code block (CB). In the conventional LTE system, CRC for CB is added to the divided CB, data bits and the CRC of the CB are encoded with a channel code, and thus coded bits are determined and a number of bits, which perform predetermined rate matching (RM) to each of coded bits, have been determined.

Hereinafter, a method for calculating a transport block size (TBS) in a 5G system will be described in detail.

$N'_{RE}$, the number of REs assigned to PUSCH mapping in one PRB in the allocated resource, is calculated. $N'_{RE}$ may be calculated by $N_{SC}^{RB} \times N_{symb}^{sh} - N_{DMRS}^{PRB} - N_{oh}^{PRB}$. Here, $N_{SC}^{RB}$ is 12, and $N_{symb}^{sh}$ may represent the number of OFDM symbols allocated to the PUSCH. $N_{DMRS}^{PRB}$ is the number of REs in one PRB occupied by DMRSs of the same CDM group. $N_{oh}^{PRB}$ is the number of REs occupied by the overhead in one PRB, which is configured via higher signaling, and may be configured as one of 0, 6, 12, or 18. Thereafter, $N_{RE}$, the total number of REs, allocated to the PDSCH may be calculated. $N_{RE}$ is calculated by min(166, $N'_{RE}) \times n_{PRB}$, and $n_{PRB}$ denotes the number of PRBs allocated to the UE. The number of temporary information bits, $N_{info}$, may be calculated by $N_{RE} \times R \times Q_m \times v$. Here, R is a code rate, $Q_m$ is a modulation order, and information of the value may be transferred using MCS bitfield and a predetermined table of DCI. In addition, v is the number of assigned layers. If $N_{info} \leq 3824$, TBS may be calculated through process below. Otherwise, TBS may be calculated through operation 4. $N'_{info}$ may be calculated by the equation of $$N'_{info} = \max\left(24, 2^n \times \left\lfloor \frac{N_{info}}{2^n} \right\rfloor\right) \text{ and } n = \max(3, \lfloor \log_2(N_{info}) \rfloor - 6).$$

TBS may be determined as a value, which is the closest to $N'_{info}$ among values equal to or larger than $N'_{info}$ in Table 9 below.

TABLE 9

| Index | TBS | Index | TBS | Index | TBS | Index | IBS |
|---|---|---|---|---|---|---|---|
| 1 | 24 | 31 | 336 | 61 | 1288 | 91 | 3624 |
| 2 | 32 | 32 | 352 | 62 | 1320 | 92 | 3752 |
| 3 | 40 | 33 | 368 | 63 | 1352 | 93 | 3824 |
| 4 | 48 | 34 | 384 | 64 | 1416 | | |
| 5 | 56 | 35 | 408 | 65 | 1480 | | |
| 6 | 64 | 36 | 432 | 66 | 1544 | | |
| 7 | 72 | 37 | 456 | 67 | 1608 | | |
| 8 | 80 | 38 | 480 | 68 | 1672 | | |
| 9 | 88 | 39 | 504 | 69 | 1736 | | |
| 10 | 96 | 40 | 528 | 70 | 1800 | | |
| 11 | 104 | 41 | 552 | 71 | 1864 | | |
| 12 | 112 | 42 | 576 | 72 | 1928 | | |
| 13 | 120 | 43 | 608 | 73 | 2024 | | |
| 14 | 128 | 44 | 640 | 74 | 2088 | | |
| 15 | 136 | 45 | 672 | 75 | 2152 | | |
| 16 | 144 | 46 | 704 | 76 | 2216 | | |
| 17 | 152 | 47 | 736 | 77 | 2280 | | |
| 18 | 160 | 48 | 768 | 78 | 2408 | | |
| 19 | 168 | 49 | 808 | 79 | 2472 | | |
| 20 | 176 | 50 | 848 | 80 | 2536 | | |
| 21 | 184 | 51 | 888 | 81 | 2600 | | |
| 22 | 192 | 52 | 928 | 82 | 2664 | | |
| 23 | 208 | 53 | 984 | 83 | 2728 | | |
| 24 | 224 | 54 | 1032 | 84 | 2792 | | |
| 25 | 240 | 55 | 1064 | 85 | 2856 | | |
| 26 | 256 | 56 | 1128 | 86 | 2976 | | |
| 27 | 272 | 57 | 1160 | 87 | 3104 | | |
| 28 | 288 | 58 | 1192 | 88 | 3240 | | |
| 29 | 304 | 59 | 1224 | 89 | 3368 | | |
| 30 | 320 | 60 | 1256 | 90 | 3496 | | |

If $N_{info} > 3824$, $N'_{info}$ may be calculated by the equation of $$N'_{info} = \max\left(3840, 2^n \times \text{round}\left(\frac{N_{info} - 24}{2^n}\right)\right)$$

and $n = \lfloor \log_2(N_{info} - 24) \rfloor - 5$. TBS can be determined through the value of $N'_{info}$ and the following pseudo-code 1. Here, 'C' corresponds to the number of code blocks (CB) included in one TB.

Start Pseudo-code 1
if $R \leq 1/4$ $$TBS = 8 \cdot C \cdot \left\lceil \frac{N'_{info} + 24}{8 \cdot C} \right\rceil - 24, \text{ where } C = \left\lceil \frac{N'_{info} + 24}{3816} \right\rceil$$

else
  if $N_{info}' > 8424$ $$TBS = 8 \cdot C \cdot \left\lceil \frac{N'_{info} + 24}{8 \cdot C} \right\rceil - 24, \text{ where } C = \left\lceil \frac{N'_{info} + 24}{8424} \right\rceil$$

else $$TBS = 8 \cdot \left\lceil \frac{N'_{info} + 24}{8} \right\rceil - 24$$

end if
end if
End Pseudo-code 1

FIG. 7 illustrates TB processing over multi-slot (TBoMS) PUSCH transmission in a 5G system according to an embodiment of the disclosure.

Referring to FIG. 7, one TB 701 may be allocated to multiple slots 702, 703, 704, and 705, and transmitted. It is possible to reduce a CRC ratio, obtain a low code rate, obtain a channel coding gain, and improve channel coverage by allocating one TB to the resources of the multiple slots 702, 703, 704, and 705 instead of allocating small amount of multiple TBs thereto. Further, referring to FIG. 7, as a time domain resource allocation method for TBoMS PUSCH transmission, a method for allocating time domain resources like PUSCH repetition type A (indicated by reference numeral 706) or a method for allocating time domain resources like PUSCH repetition type B (indicated by reference numeral 707) may be applied.

When resource allocation to PUSCH for TBoMS is performed like PUSCH repetition type A, the PUSCH may be transmitted through multiple slots, each of which has the same symbol resource. On the other hand, when time domain resource allocation to PUSCH for TBoMS is performed like PUSCH repetition type B, resource allocation may be performed like case 0 708, case 1 709, case 2 710 according to the configured symbol length L through higher layer signaling and L1 signaling.

The disclosure provides a method for frequency hopping when PUSCH transmission in which one TB is allocated for multiple slots (referred to as TBoMS) is configured) in a 5G communication system, and a method for configuring frequency hopping of repetitive transmission and interleaving of TBoMS. PUSCH transmission for allocating one TB to multiple slots (TBoMS) according to an embodiment of the disclosure enables flexible configuration of time domain resources, and may be used to obtain additional coding gain through a method for determining a TB regarding multiple slots. In addition, the method of the disclosure may be used to improve channel coverage by obtaining frequency diversity and time diversity.

A method for operating a UE for configuring frequency hopping and a repetitive transmission method when transmitting one TB through a multi-slot PUSCH based on a PUSCH for transmitting one TB to multiple slots according to an embodiment of the disclosure may include: receiving, from a base station, multi-slot transmission (TBoMS) configuration information for transmission of a PUSCH configured by one TB transmitted through multiple slots; receiving, from the base station, frequency hopping configuration information and repetition configuration information for the TBoMS; and transmitting one TB to the base station through a multi-slot PUSCH, based on the configured TBoMS configuration information, repetition configuration information for the TBoMS, and frequency hopping configuration information.

A method for operating a base station for configuring frequency hopping and a repetitive transmission method when receiving one TB through a multi-slot PUSCH based on a physical uplink shared channel (PUSCH) for transmitting one TB to multiple slots according to an embodiment of the disclosure may include: transmitting, to a UE, multi-slot transmission (TBoMS) configuration information for transmission of a PUSCH configured by one TB through multiple slots; transmitting, to the UE, frequency hopping configuration information and repetition configuration information for the TBoMS; and receiving, from the UE, one TB processing over multi-slot PUSCH transmission and repetitive transmission, based on the configured TBoMS configuration information, repetition configuration information for the TBoMS, and frequency hopping configuration information.

According to the disclosure, a method for configuring frequency hopping and a repetitive transmission method for multiple PUSCH transmissions for TB processing over multiple slots will be described through embodiments.

The present embodiment provides a frequency hopping method and a repetitive transmission method for one TB processing over multi-slot PUSCH transmission in a 5G system. The embodiment of the disclosure has been described as consecutive TBoMS PUSCH transmission for the resources capable of transmitting PUSCH based on the number of same PRBs and start symbol between TBoMS repetitive transmissions. However, this is only for example and does not limit the scope of the disclosure. In addition, TBoMS repetitive transmission may be performed based on the number of different PRBs, start symbols, and symbol lengths between repetitive transmissions and transmitted.

The repetitive transmission method, the frequency hopping method, and the configured TBoMS repetitive transmission interleaving method according to an embodiment of the disclosure can obtain flexible time domain resource utilization and additional coding gain, and can be applied to improve uplink coverage through frequency/time diversity gain. Hereinafter, in describing the overall embodiments of the disclosure, PUSCH transmission of TBoMS has been described as an example, but this is only for illustration and does not limit the scope of the disclosure. Further, another embodiment according to the disclosure can be applied to a case of PUSCH/PDSCH/PSSCH transmission, which is predefined/preconfigured or configured through signaling between a base station and a UE. In addition, hereinafter, according to an embodiment of the disclosure, in a repetitive transmission method applied to multi-slot PUSCH transmission in which one TB is configured, a frequency hopping method, and an interleaving method for TBoMS repetitive transmission, a random value which is predefined/preconfigured or configured through signaling between the base station and the UE may be configured as one or a combination of the number of RBs, symbol/slot length, continuity of PUSCH transmissions, an interval between PUSCH transmissions, the number of PUSCH transmissions, etc.

First Embodiment

The first embodiment of the disclosure provides a TBoMS repetitive transmission method when one TB is transmitted through a PUSCH over multiple slots (hereinafter, referred to as TBoMS), and an interleaving method for the TBoMS repetitive transmission. In the disclosure, an example of transmitting a TB through a PUSCH is described, and this method may also be applied to PDSCH/PSSCH transmission.

Figure 8:
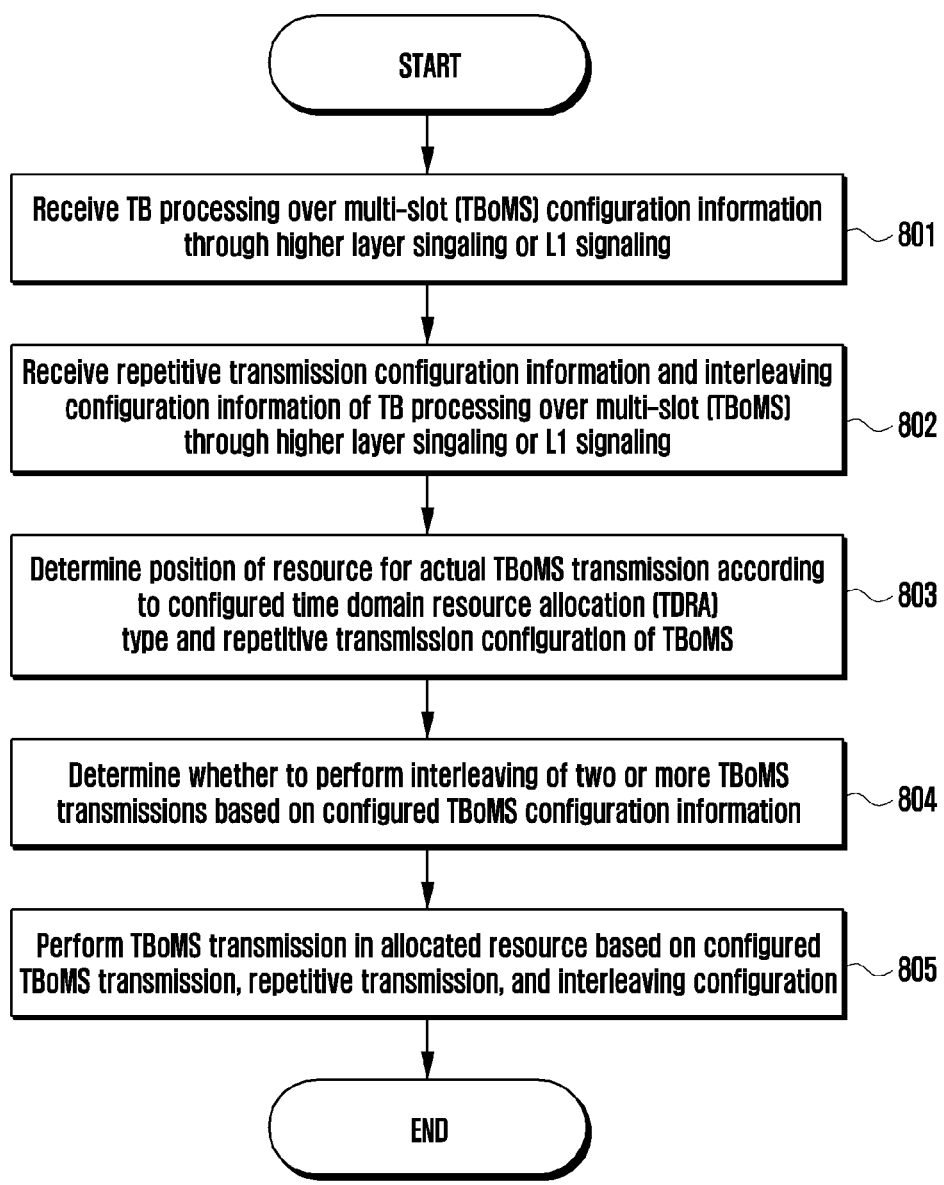
FIG. 8 is a flowchart illustrating an operation of a UE for configuring interleaving for one TB processing over multi-slot PUSCH transmission and repetitive transmission according to an embodiment of the disclosure.

FIG. 8 is a flowchart illustrating an operation of a UE for performing TBoMS repetitive transmission by applying the configured TBoMS repetitive transmission information and interleaving configuration for one TB processing over multi-slot PUSCH transmission in a 5G system according to an embodiment of the disclosure.

Referring to FIG. 8, a UE may receive, from a base station through higher layer signaling or L1 signaling, configuration information including at least one of the number of slots for transmission of one TB processing over multi-slot PUSCH (TBoMS), a start symbol, a length of a symbol, or time-domain resource allocation (TDRA) type (indicated by reference numeral 801).

The UE may receive repetitive transmission configuration information of TBoMS and interleaving configuration information from the base station based on the configured TBoMS configuration information (indicated by reference numeral 802).

The UE may determine a resource to be used for the actual TBoMS transmission based on the configured TBoMS time domain resource allocation type and TBoMS repetitive transmission configuration (indicate by reference numeral 803).

In addition, the UE may perform interleaving of TBoMSs configured by different TBs based on the configured interleaving configuration information of the TBoMS (indicated by reference numeral 804). Thereafter, the UE may perform TBoMS transmission in the allocated resource based on the configured TBoMS transmission, repetitive transmission, and interleaving configuration information (indicated by reference numeral 805).

Figure 9:
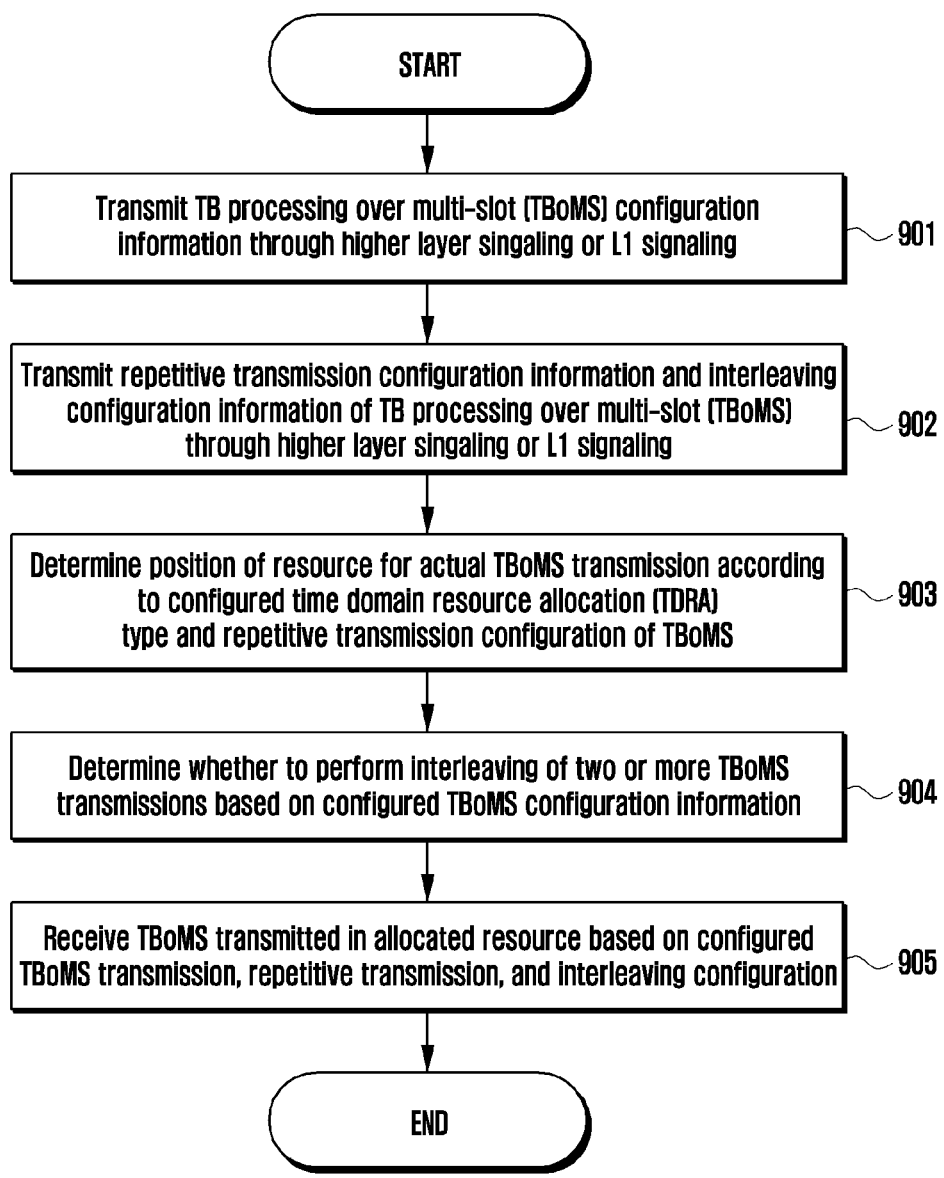
FIG. 9 is a flowchart illustrating an operation of a base station for controlling interleaving for one TB processing over multi-slot PUSCH transmission and repetitive transmission according to an embodiment of the disclosure.

FIG. 9 is a flowchart illustrating an operation of a base station for configuring TBoMS repetitive transmission information and interleaving configuration information for one TB processing over multi-slot PUSCH transmission in a 5G system according to an embodiment of the disclosure.

Referring to FIG. 9, a base station may transmit, to a UE through higher layer signaling or L1 signaling, configuration information including at least one of the number of slots for transmission of one TB processing over multi-slot PUSCH (TBoMS), a start symbol, a length of a symbol, or time-domain resource allocation (TDRA) type (indicated by reference numeral 901).

The base station may transmit repetitive transmission configuration information of TBoMS to the UE based on the configured TBoMS configuration information (indicated by reference numeral 902).

The base station may determine a resource to be used for actual TBoMS transmission based on the configured TBoMS time domain resource allocation type and TBoMS repetitive transmission configuration (indicated by reference numeral 903).

In addition, the base station may determine whether to perform interleaving of TBoMSs configured by different TBs based on the configured interleaving configuration information of the TBoMS (indicated by reference numeral 904). Thereafter, the UE may receive the TBoMS from the allocated resources based on the configured TBoMS transmission, repetitive transmission, and interleaving configuration information (indicated by reference numeral 905).

In the above method, when the base station and the UE perform TBoMS transmission and TBoMS repetitive transmission, flexible resource allocation may be possible for each TBoMS repetitive transmission based on the configured TBoMS repetitive transmission information. In addition, interleaving of TBoMSs configured by different TBs may be performed in time domain resources.

Figure 10:
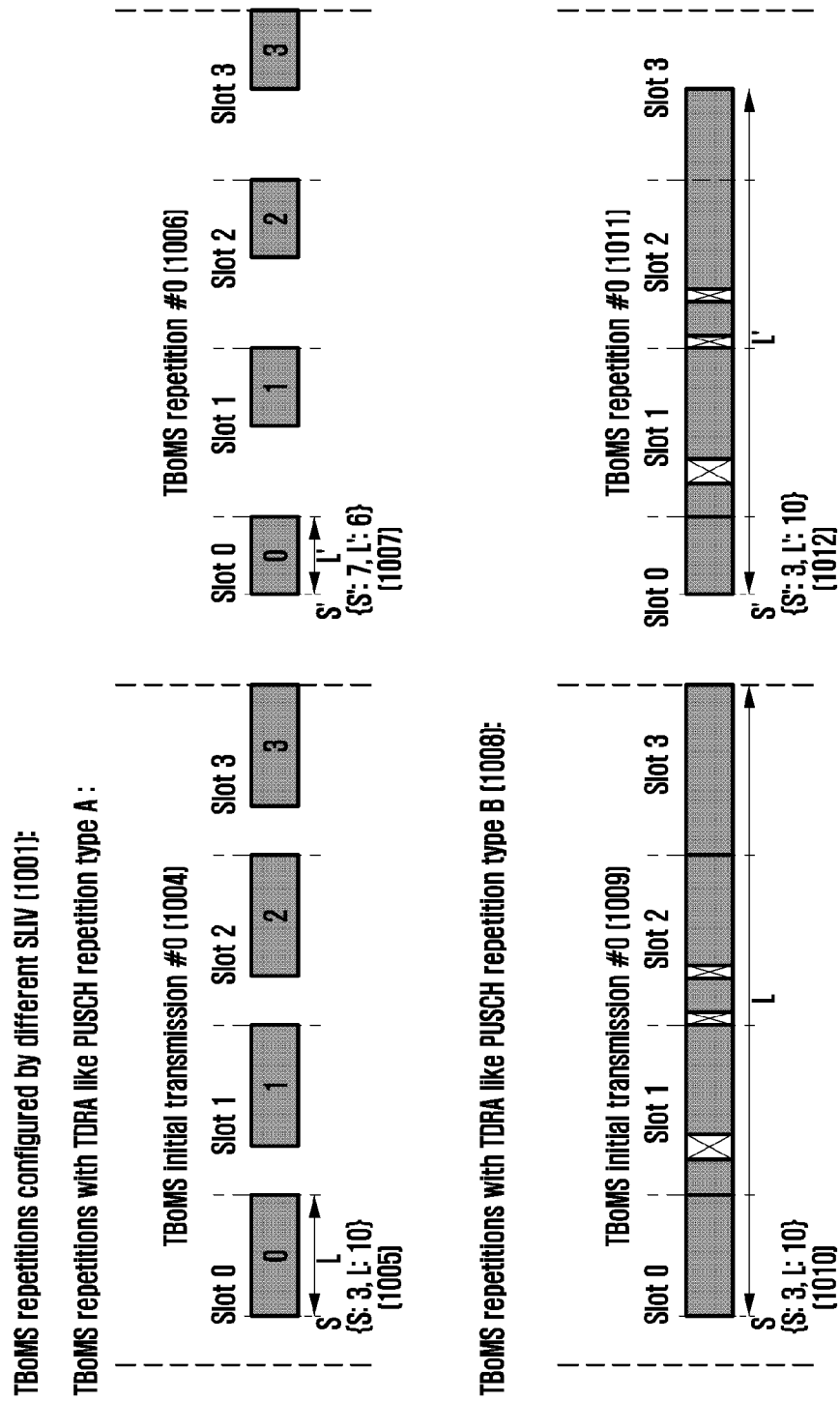
FIG. 10 illustrates an example of a method for applying different TBoMS configuration information to one TB processing over multi-slot PUSCH (TBoMS) repetitive transmission according to an embodiment of the disclosure.

FIG. 10 illustrates an example of a repetitive transmission method for one TB processing over multi-slot PUSCH (TBoMS) having different resource allocation configuration information according to an embodiment of the disclosure.

Referring to FIG. 10, when TBoMS and repetitive transmission are configured through higher layer signaling and L1 signaling, TBoMS repetitive transmission may be performed according to a time domain resource allocation type. Each TBoMS repetitive transmission may be performed through resources allocated based on different start symbols and symbol lengths.

For example, the time domain resource allocation type of TBoMS may be configured like PUSCH repetition type A and the number of multiple slots of TBoMS may be configured to be 4 through higher layer signaling and L1 signaling. The configured number of repetitions of the TBoMS may be configured to be 2, and each TBoMS repetitive transmission may be configured by different start and length indicators (SLIVs) (indicated by reference numeral 1001). For example, "PUSCH-TimeD omainResourceAllocation" for TBoMS repetitive transmission may be configured by including multiple different startSymbolAndLength variables through higher layer signaling and L1 signaling. Through the above method, when a configuration of the initial transmission {start symbol S: 3, the symbol length L: 10} (indicated by reference numeral 1005) and a configuration of the repetitive transmission {start symbol S': 7, the symbol length L': 6} (indicated by reference numeral 1007) are configured, TBoMS initial transmission #0 1004 and TBoMS repetitive transmission #0 1006 may be performed based on each configuration.

In addition, through higher layer signaling and L1 signaling, the time domain resource allocation type of TBoMS may be configured like PUSCH repetition type B, and the number of multiple slots of TBoMS may be configured to be 4. The configured number of TBoMS repetitive transmissions may be configured to be 2, and each TBoMS repetitive transmission may be configured for different start and length indicators (SLIV) (indicated by reference numeral 1008). For example, "PUSCH-TimeDomainResourceAllocation" for TBoMS repetitive transmission may be configured by including multiple different startSymbolAndLength variables through higher layer signaling and L1 signaling. Through the above method, when a configuration of the initial transmission {start symbol S: 3, the symbol length L: 10} (indicated by reference numeral 1010) and a configuration of the repetitive transmission {start symbol S': 7, the symbol length L': 6} (indicated by reference numeral 1012) are configured, TBoMS initial transmission #0 1009 and TBoMS repetitive transmission #0 1011 may be performed based on each configuration. However, this is for illustrative purposes only, and does not limit the scope of the disclosure. Based on the number of TBoMS repetitive transmissions, each TBoMS repetitive transmission configuration may be configured based on signaling, or may be repeatedly applied to two or more specific configurations.

Figure 11:
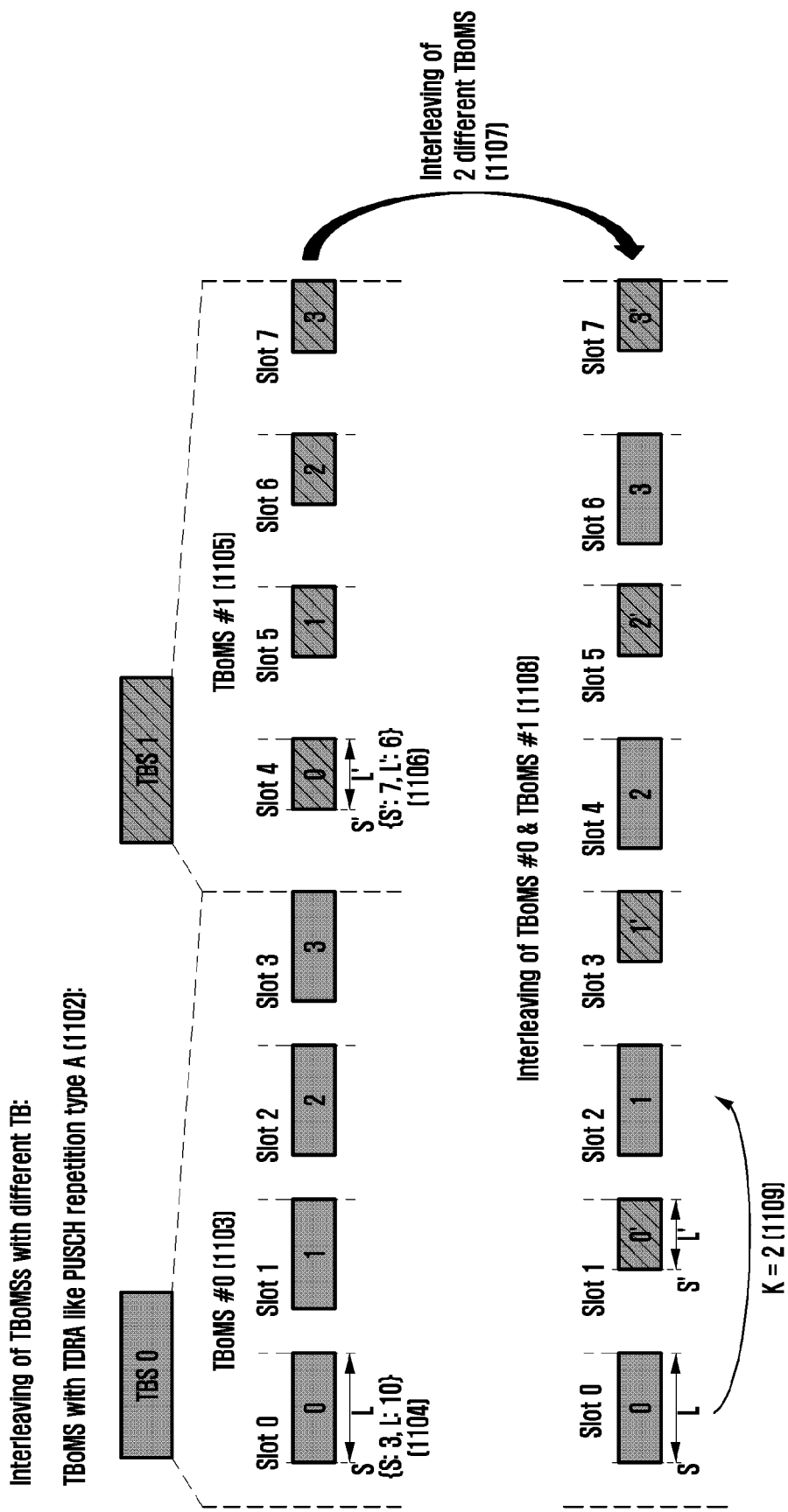
FIG. 11 illustrates an example of a method for performing interleaving for one TB processing over multi-slot PUSCH (TBoMS) transmission with different TBs according to an embodiment of the disclosure.

FIG. 11 illustrates an example of a method for interleaving between TBoMS (one TB processing over multi-slot PUSCH) transmissions configured by different TBs according to an embodiment of the disclosure.

Referring to FIG. 11, TBoMS #0 1103 and TBoMS #1 1105 for transmitting two different TBs in which time domain resources are configured like PUSCH repetition type A (indicated by reference numeral 1102) through higher layer signaling and L1 signaling may be configured based on {S: 3, L: 10} (indicated by reference numeral 1104) and {S': 7, L': 6} (indicated by reference numeral 1106), respectively, and transmitted. By applying interleaving for TBoMS #0 and TBoMS #1 (indicated by reference numeral 1107), TBoMS #0 and TBoMS #1 may be interleaved and transmitted (indicated by reference numeral 1108). In this case, the location of a slot of the TBoMS for interleaving may be determined based on the number 'k' (indicated by reference numeral 1109) of TBoMS configured by different TBs to be interleaved, and resources may be allocated based on the determined slot location. According to the method of the disclosure, it is possible to improve the coverage of a channel by obtaining time diversity.

Figure 12:
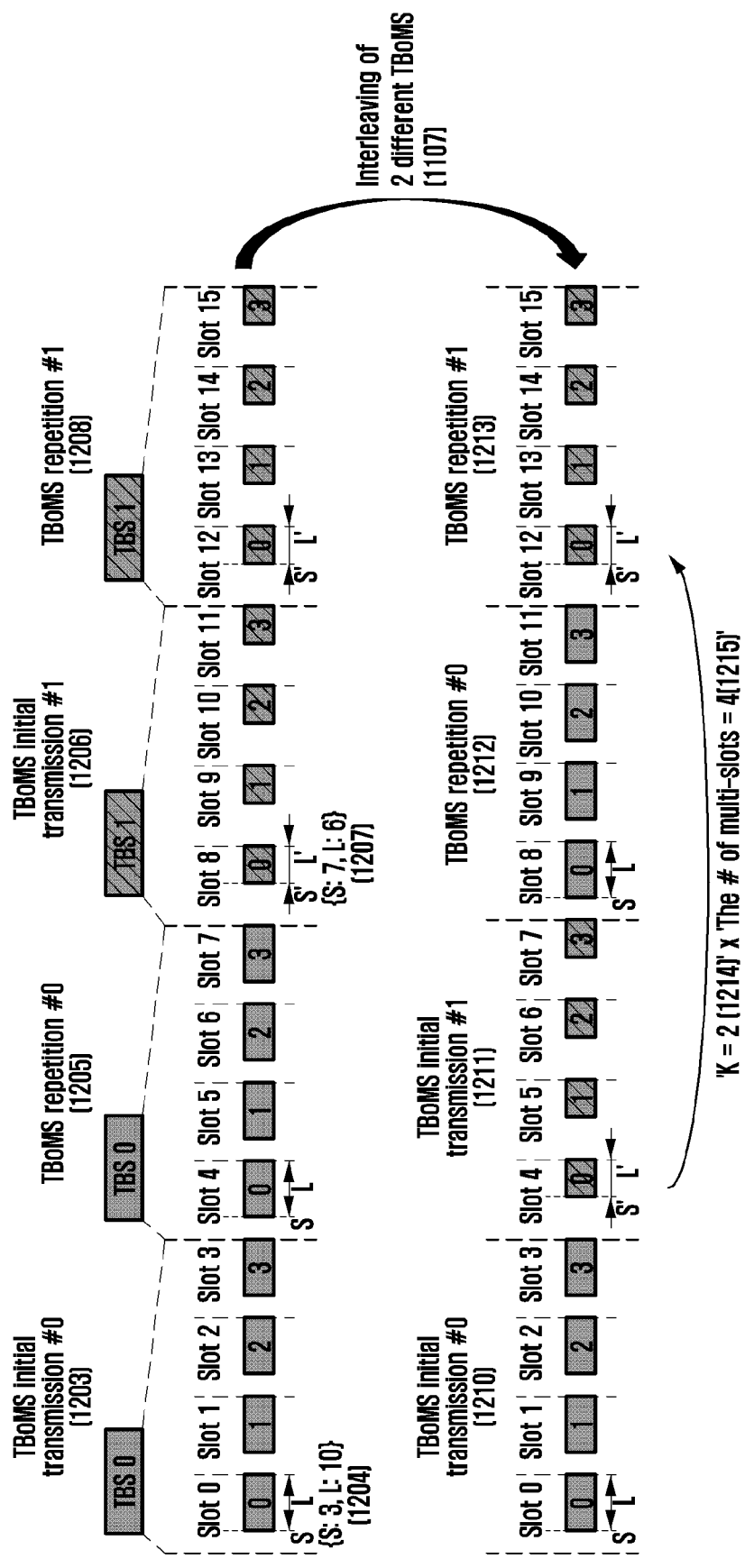
FIG. 12 illustrates an example of a method for performing interleaving between one TB processing over multi-slot PUSCH (TBoMS) repetitive transmissions with different TBs according to an embodiment of the disclosure.

FIG. 12 illustrates an example of a method for performing interleaving between TBoMS (each TBoMS refers to one TB processing over multi-slot PUSCH) repetitive transmissions configured by different TBs according to an embodiment of the disclosure.

Referring to FIG. 12, TBoMS #0 1203 and TBoMS #1 1206 for transmitting two different TBs (TBS 0 and TBS 1) in which time domain resources are configured like PUSCH repetition type A (indicated by reference numeral 1202) through higher layer signaling and L1 signaling) may be configured as {S: 3, L: 10} (indicated by reference numeral 1204) and {S': 7, L': 6} (indicated by reference numeral 1207), respectively, and transmitted. In addition, TBoMS #0 and TBoMS #1 for transmitting different TBs are configured for repeatedly transmitted twice, which results in transmission of TBoMS initial transmission #0 1203, TBoMS repetitive transmission #0 1205, TBoMS initial transmission #1 1206, and TBoMS repetitive transmission #1 1208. Interleaving based on TBoMS repetitive transmission may be applied to TBoMS repetitive transmission configured by different TBs (TBS 0 and TBS 1) (indicated by reference numeral 1209). In this case, the configured interleaving is applied to TBoMS repetitive transmission configured by two different TBs (TBS 0 and TBS 1), which results in transmission in the order of TBoMS initial transmission #0 1210, TBoMS initial transmission #1 1211, TBoMS repetitive transmission #0 1212, TBoMS repetitive transmission #1 1213. The position of the first slot of TBoMS repetitive transmission for interleaving may have an interval of $(k \times N_{slot}^{TBoMS})$ based on the number 'k' 1214 of TBoMS configured by different TBs to be interleaved and the number of multiple slots $N_{slot}^{TBoMS}$ of TBoMS equals 4 1215, and resources may be allocated based on the interval. According to the method of the disclosure, it is possible to improve the coverage of a channel by obtaining time diversity. However, this is for illustration only, and does not limit the scope of the disclosure, and interleaving based on TBoMS transmission may be applied for TBoMS repetitive transmission in which time resource is allocated like PUSCH repetition type B. In addition, a slot interval for resource allocation at the time of application of interleaving may be configured using a random variable through additional higher layer signaling and L1 signaling, and thus interleaving may be applied. For example, interleaving may be applied between TBoMSs having different TBs in units of two slots for a TBoMS configured by four multiple slots.

Second Embodiment

The second embodiment of the disclosure may provide a frequency hopping method and a TBoMS repetitive transmission method when performing transmission of one TB over a multi-slot PUSCH (TBoMS). In the disclosure, PUSCH is mainly described, and this method may also be applied to PDSCH/PSSCH transmission.

Figure 13:
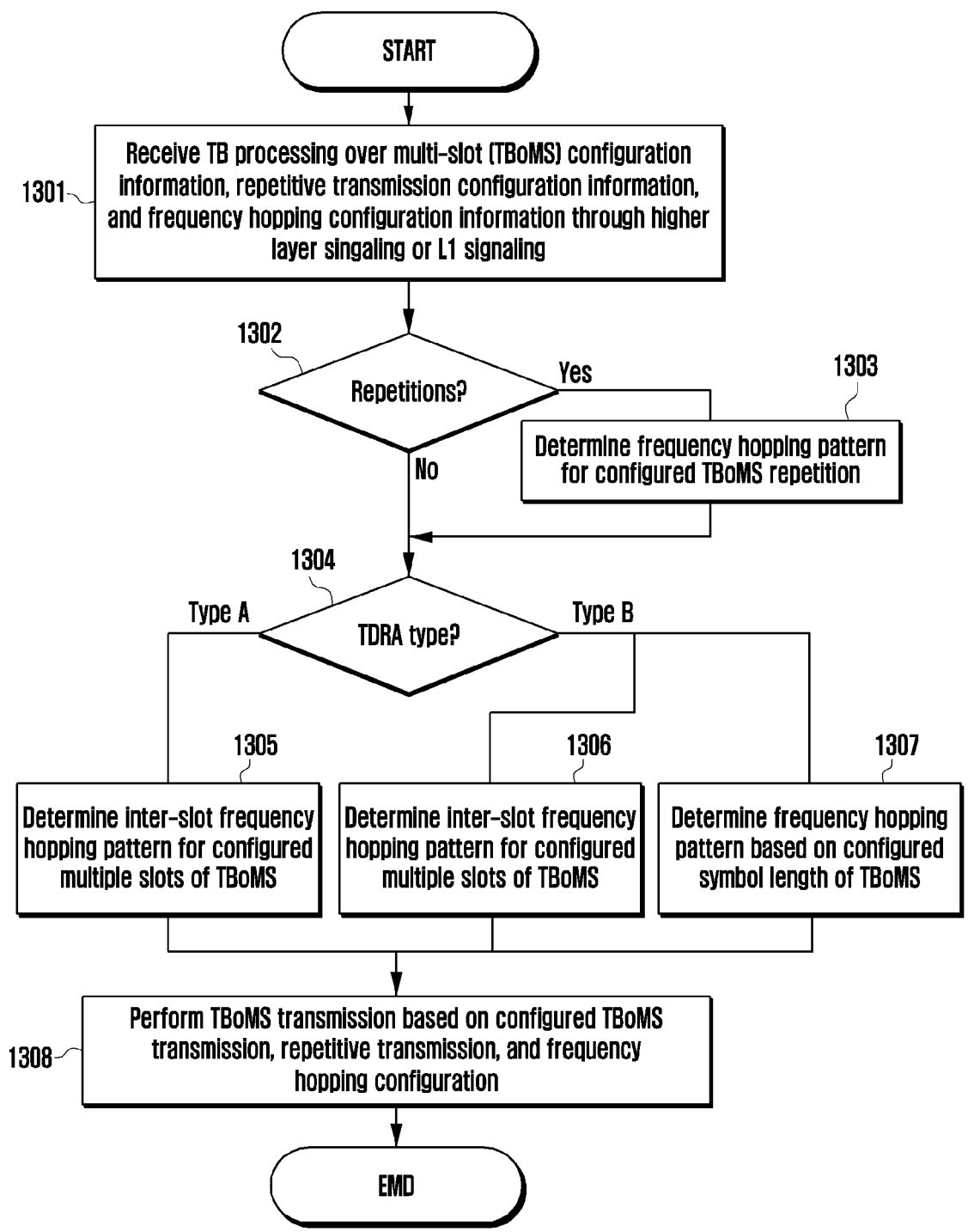
FIG. 13 is a flowchart illustrating an operation of a UE for configuring frequency hopping for one TB processing over multi-slot PUSCH transmission and repetitive transmission according to an embodiment of the disclosure.

FIG. 13 is a flowchart illustrating an operation of a UE for performing TBoMS transmission or repetitive transmission by applying TBoMS repetitive transmission configuration and frequency hopping configuration for one TB processing over multi-slot PUSCH transmission in a 5G system according to an embodiment of the disclosure.

Referring to FIG. 13, a UE may receive, from a base station through higher layer signaling or L1 signaling, configuration information including at least one of the number of slots for transmission of one TB processing over multi-slot PUSCH (TBoMS), a start symbol, a length of a symbol, or time-domain resource allocation (TDRA) type, TBoMS repetitive transmission configuration information, or frequency hopping configuration information (indicated by reference numeral 1301).

The UE may determine whether TBoMS repetitive transmission is configured, based on the configured TBoMS configuration information (indicated by reference numeral 1302).

When TBoMS repetitive transmission is configured, the UE may determine a frequency hopping pattern between TBoMS repetitive transmissions (indicated by reference numeral 1303). In case that the TBoMS repetitive transmission is not configured, the UE may determine a frequency hopping pattern within the TBoMS based on the time domain resource allocation type of the TBoMS. The UE identifies the configured time domain resource allocation type of the TBoMS (indicated by reference numeral 1304), and when the identified time domain resource allocation type is configured like PUSCH repetition type A, the UE may apply an inter-slot frequency hopping pattern (indicated by reference numeral 1305).

On the other hand, when the configured time domain resource allocation method of the TBoMS is configured like PUSCH repetition type B, an inter-slot frequency hopping pattern for the configured multi-slot TBoMS (indicated by reference numeral 1306) or a frequency hopping pattern based on the configured symbol length 'L' of TBoMS (indicated by reference numeral 1307) may be configured. Thereafter, the UE may perform TBoMS transmission or repetitive transmission by applying the configured TBoMS configuration information, repetitive transmission configuration information, and frequency hopping pattern (indicated by reference numeral 1308).

Figure 14:
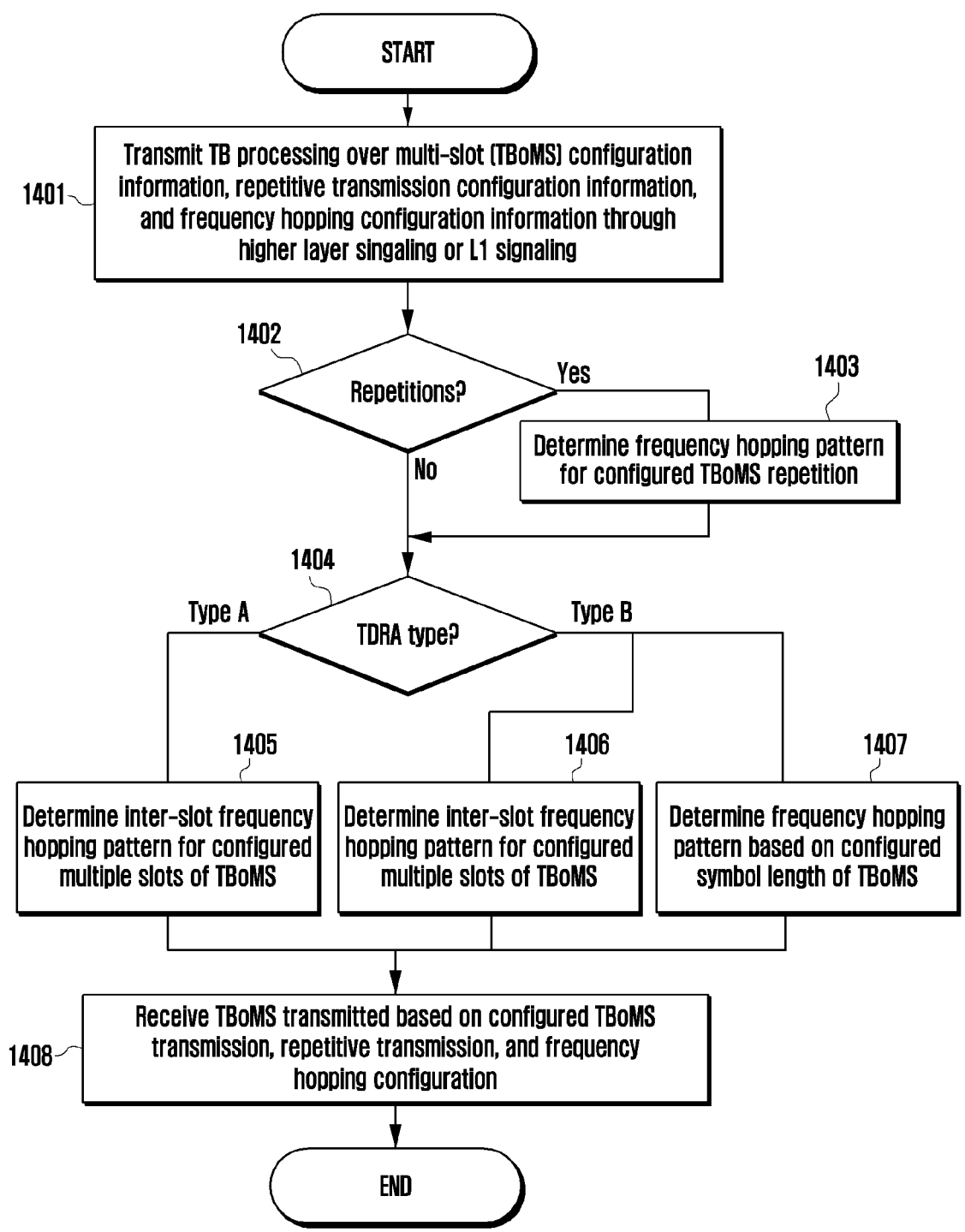
FIG. 14 is a flowchart illustrating an operation of a base station for controlling frequency hopping for one TB processing over multi-slot PUSCH transmission and repetitive transmission according to an embodiment of the disclosure.

FIG. 14 is a flowchart illustrating an operation of a base station for receiving TBoMS, which is transmitted by applying the configured TBoMS repetitive transmission configuration and frequency hopping configuration for one TB processing over multi-slot PUSCH transmission in a 5G system according to an embodiment of the disclosure.

Referring to FIG. 14, a base station may transmit, to a UE through higher layer signaling or L1 signaling, configuration information including at least one of the number of slots for transmission of one TB processing over multi-slot PUSCH (TBoMS), a start symbol, a length of a symbol, and time-domain resource allocation (TDRA) type, TBoMS repetitive transmission configuration information, or frequency hopping configuration information (indicated by reference numeral 1401).

The base station may identify whether TBoMS repetitive transmission is configured, based on the configured TBoMS configuration information (indicated by reference numeral 1402). When TBoMS repetitive transmission is configured, the base station may determine a frequency hopping pattern between TBoMS repetitive transmissions (indicated by reference numeral 1403). In case that the TBoMS repetitive transmission is not configured, the base station may determine a frequency hopping pattern within the TBoMS based on the time domain resource allocation type of the TBoMS. When the configured time domain resource allocation type of the TBoMS is identified (indicated by reference numeral 1404) and is determined to be configured like PUSCH repetition type A, an inter-slot frequency hopping pattern may be applied (indicated by reference numeral 1405). On the other hand, when the configured time domain resource allocation method of the TBoMS is configured like PUSCH repetition type B, an inter-slot frequency hopping pattern for the multi-slot TBoMS (indicated by reference numeral 1406) or a frequency hopping pattern based on the configured TBoMS symbol length 'L' (indicated by reference numeral 1407) may be configured. Thereafter, the base station may receive TBoMS, which is transmitted by applying the configured TBoMS configuration information, repetitive transmission configuration information, and frequency hopping pattern (indicated by reference numeral 1408).

In the above method, when the base station and the UE perform TBoMS transmission and TBoMS repetitive transmission, a frequency hopping pattern within TBoMS and a frequency hopping pattern between TBoMS repetitive transmissions may be determined based on the TBoMS configuration information, repetitive transmission information, and frequency hopping configuration information, and applied. Through the method of the disclosure, frequency hopping is applied to TBoMS transmission or repetitive transmission to obtain a frequency diversity gain, so as to enable enhancement in the channel coverage.

FIG. 15 illustrates an example of a frequency hopping configuration method for one TB processing over multi-slot PUSCH (TBoMS) transmission according to an embodiment of the disclosure.

Referring to FIG. 15, provided is a method of applying inter-slot frequency hopping to TBoMS #0 1503 transmission in which a time domain resource is configured like PUSCH repetition type A through higher layer signaling and L1 signaling (indicated by reference numeral 1502). When the number of multiple slots of TBoMS is configured to be 4 through the higher layer signaling and L1 signaling and a frequency hopping offset 1505 is configured as 'frequency-HoppingOffset', frequency hopping may be applied to multiple slots within TBoMS. In addition, when inter-slot frequency hopping for TBoMS #1 1504 transmission in which a time domain resource is configured like PUSCH repetition type A through the higher layer signaling and L1 signaling (indicated by reference numeral 1502) is applied, if variable $N_{slot}^{FH}=2$ slot in slot units for frequency hopping (indicated by reference numeral 1506) is configured through the signaling, the frequency hopping may be performed by applying Equation 0.

$$RB_{start}(n_s^\mu) = \begin{cases} RB_{start} & \left\lfloor \dfrac{n_s^\mu}{N_{slot}^{FH}} \right\rfloor \mod 2 = 0 \\ RB_{start} + RB_{offset} & \left\lfloor \dfrac{n_s^\mu}{N_{slot}^{FH}} \right\rfloor \mod 2 = 1 \end{cases} \quad \text{Equation 0}$$

Here, $RB_{offset}$ is a frequency hopping offset configured through higher layer signaling and L1 signaling, and $n_s^\mu$ denotes multiple slots of TBoMS. The above method can be equally applied to slot-based inter-slot frequency hopping for TBoMS in which time domain configuration is performed like PUSCH repetition type B.

In another method, when TBoMS #0 1508 transmission, in which a time domain resource is configured like PUSCH repetition type B through higher layer signaling and L1 signaling (indicated by reference numeral 1507), and as TBoMS configuration, the start symbol 'S=5', the length of the TBoMS symbol 'L=37', and the total number of multiple slots of TBoMS $N'^{TBoMS}_{slot}=4$ slot, is configured, frequency hopping based on the configured start symbol 'S' and the symbol length 'L' of the configured TBoMS #0 1508 transmission may be applied. Frequency hopping may be performed using Equation 1 using the configured start symbol 'S=5' of the TBoMS, the length of the TBoMS symbol 'L=37', and a frequency hopping offset.

$$RB_{start}(n_s^\mu) = \begin{cases} RB_{start} \left\lfloor \dfrac{n_s^\mu}{K} \right\rfloor \mod 2 = 0 \\ RB_{start} + RB_{offset} \left\lfloor \dfrac{n_s^\mu}{K} \right\rfloor \mod 2 = 1 \end{cases} \quad (K = \lceil S + L/N_{symb}^{slot} \rceil)$$

Here, K may be calculated based on a value obtained by dividing the start symbol 'S' and the symbol length 'L' of TBoMS by the number of symbols per slot '$N_{symb}^{slot}$'.

Figure 16:
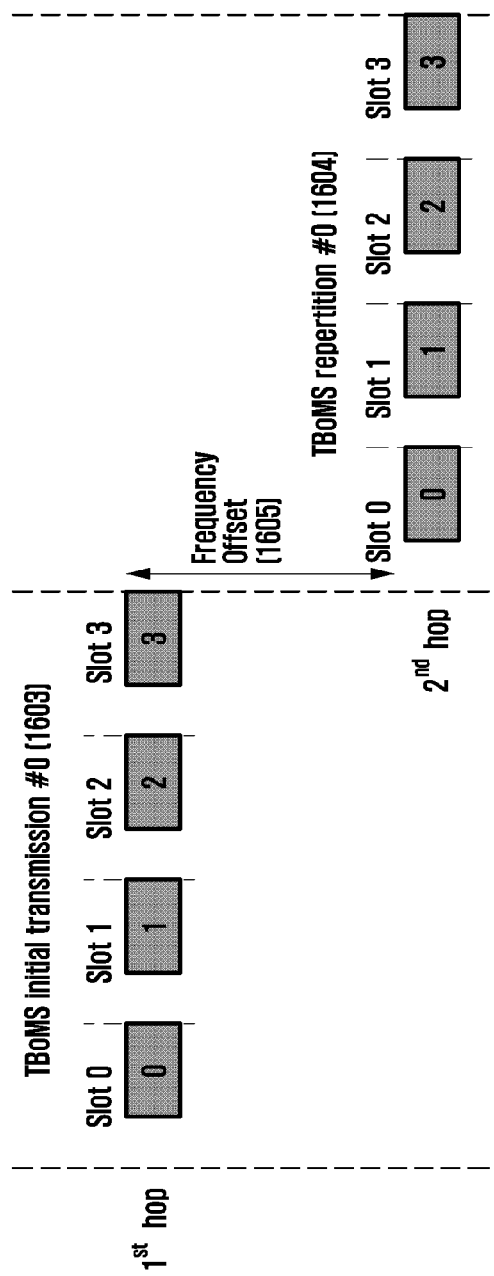
FIG. 16 illustrates an example of a method for performing frequency hopping between TBoMS repetitive transmissions of one TB processing over multi-slot PUSCH (TBoMS) repetitive transmission according to an embodiment of the disclosure.

FIG. 16 illustrates an example of a method for configuring inter-TBoMS frequency hopping for one TB processing over multi-slot PUSCH (TBoMS) repetitive transmission according to an embodiment of the disclosure.

Referring to FIG. 16, a method for applying inter-TBoMS frequency hopping for TBoMS initial transmission #0 1603 and TBoMS repetitive transmission #0 1604 in which time domain resources are configured like PUSCH repetition type A through higher layer signaling and L1 signaling is shown (indicated by reference numeral 1602). When TBoMS #0 configured by four slots is transmitted through the higher layer signaling and L1 signaling for TBoMS initial transmission #0 1603 and TBoMS repetitive transmission #0 1604, frequency hopping may be applied between TBoMS repetitive transmissions, and a frequency hopping offset 1605 between TBoMS repetitive transmissions, configured at the time of TBoMS repetitive transmission, may be applied for the frequency hopping.

Figure 17:
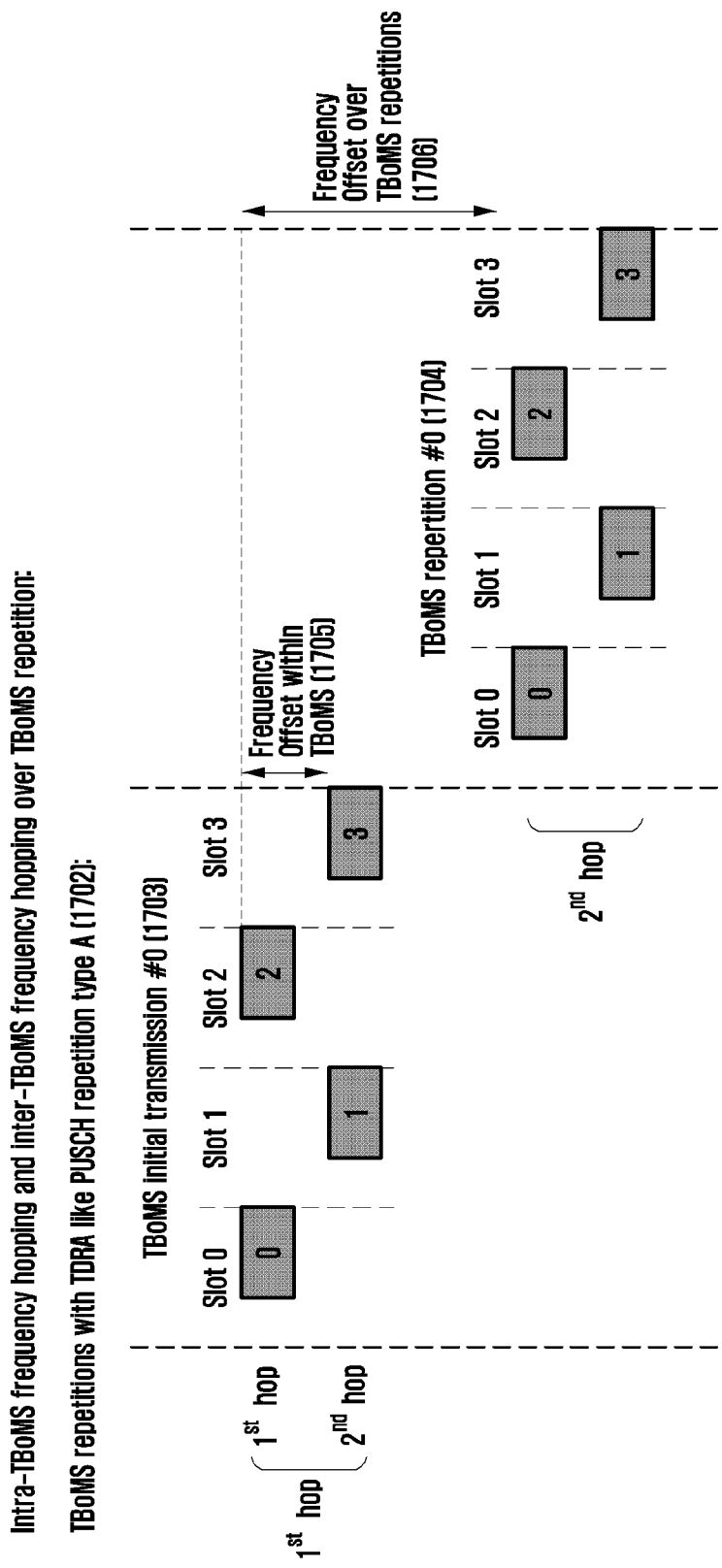
FIG. 17 illustrates an example of a method for performing frequency hopping for multiple slots within TBoMS and between TBoMS repetitive transmissions of one TB processing over multi-slot PUSCH (TBoMS) repetitive transmission according to an embodiment of the disclosure.

FIG. 17 illustrates an example of a method for configuration of frequency hopping between TBoMS repetitive transmissions and frequency hopping within TBoMS for one TB processing over multi-slot PUSCH (TBoMS) repetitive transmission according to an embodiment of the disclosure.

Referring to FIG. 17, provided is a method for applying inter-TBoMS frequency hopping to TBoMS initial transmission #0 1703 and TBoMS repetitive transmission #0 1704 in which a time domain resource is configured like PUSCH repetition type A through higher layer signaling and L1 signaling (indicated by reference numeral 1702), and for performing intra-TBoMS frequency hopping within the TBoMS initial transmission #0 1703 and TBoMS repetitive transmission #0 1704.

TBoMS #0 configured by 4 slots may be configured for TBoMS initial transmission #0 1703 and TBoMS repetitive transmission #0 1704 through the higher layer signaling and L1 signaling. An intra-TBoMS frequency hopping offset 1705 for multiple slots within TBoMS configured during TBoMS repetitive transmission may be applied to frequency hopping for multiple slots within TBoMS and transmitted, and an inter-TBoMS frequency hopping offset 1706 between TBoMS repetitive transmissions may be applied to frequency hopping between TBoMS repetitive transmissions and transmitted. This is for illustration only and does not limit the scope of the disclosure, and inter-TBoMS frequency hopping based on TBoMS transmission may be applied with regard to TBoMS repetitive transmission in which a time resource is allocated like PUSCH repetition type B, and the inter-TBoMS frequency hopping offset and the intra-TBoMS frequency hopping offset may be configured to have the same value. In addition, for the inter-TBoMS frequency hopping configuration, Equation 0 or Equation 1 may be used according to the configured time domain resource allocation method for TBoMS repetitive transmission. Here, TBoMS repetitive transmission $n_{repe}^{TBoMS}$ may be substituted for $n_s^\mu$ the slot of TBoMS in Equation 0 and applied. The second embodiment of the disclosure provides a method for applying frequency hopping to TBoMS transmission and repetitive transmission. Through the above method, flexible allocation of the frequency resources of the TBoMS is possible, and accordingly a frequency diversity gain can be obtained to improve channel coverage.

Figure 18:
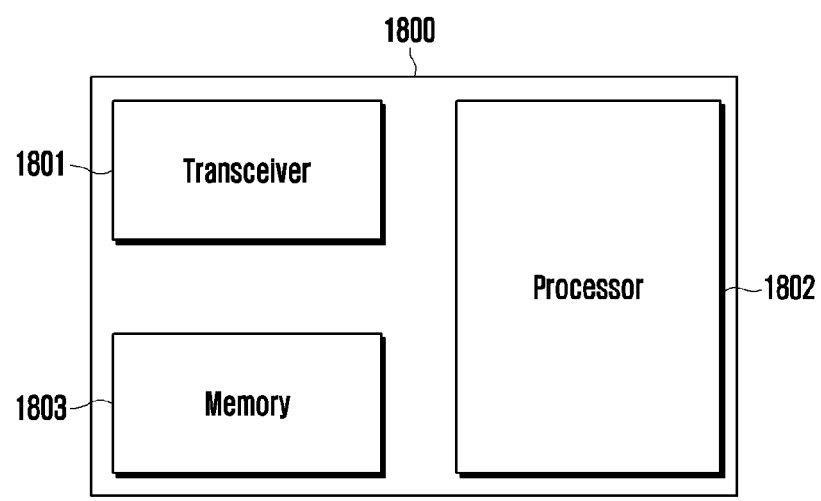
FIG. 18 is a block diagram of a UE according to an embodiment of the disclosure.

FIG. 18 is a block diagram of a UE according to an embodiment of the disclosure.

Referring to FIG. 18, a UE 1800 may include a transceiver 1801, a controller 1802, and a storage (memory) 1803. According to the efficient channel and signal transmission and reception method in a 5G communication system corresponding to the above-described embodiment, the transceiver 1801, the controller 1802, and the storage 1803 of the UE 1800 may operate. However, the elements of the UE 1800 are not limited to the above-described example. According to another embodiment, the UE 1800 may include more or fewer elements than the described elements. In addition, in a specific case, the transceiver 1801, the controller 1802, and the storage 1803 may be implemented in the form of a single chip.

According to another embodiment, the transceiver 1801 may include a transmitter and a receiver. The transceiver 1801 may transmit/receive a signal to/from the base station. The signal may include control information and data. To this end, the transceiver 1801 may include an RF transmitter for up-converting and amplifying a frequency of a transmitted signal, an RF receiver for low-noise amplifying and down-converting a received signal, and the like. In addition, the transceiver 1801 may receive a signal through a wireless channel and output the signal to the controller 1802, and may transmit the signal, which is output from the controller 1802, through the wireless channel.

The controller 1802 may control a series of processes to enable the UE 1800 to be operated according to the above-described embodiment. For example, the controller 1802 may perform a method of changing an OFDM symbol position of a DMRS by considering a method of estimating a channel by simultaneously using DMRSs transmitted through a plurality of PUSCHs according to an embodiment of the disclosure. To this end, the controller 1802 may include at least one processor. For example, the controller 1802 may include a communication processor (CP) for performing control for communication and an application processor (AP) for controlling a higher layer such as an application program.

The storage 1803 may store data or control information, such as information related to channel estimation using DMRSs transmitted through a PUSCH, included in a signal acquired from the UE 1800, or may include an area for storing data required for control of the controller 1802 and data generated during control of the controller 1802.

Figure 19:
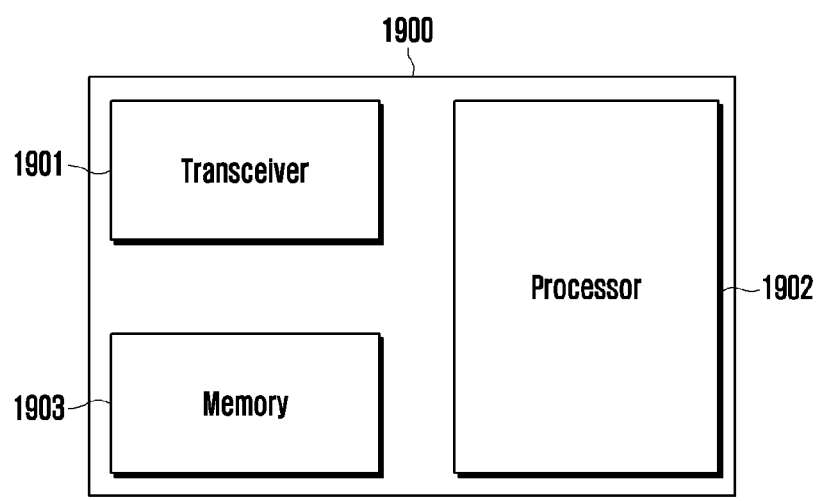
FIG. 19 is a block diagram of a base station according to an embodiment of the disclosure.

FIG. 19 is a block diagram of a base station according to an embodiment of the disclosure.

Referring to FIG. 19, a base station 1900 may include a transceiver 1901, a controller (processor) 1902, and a storage (memory) 1903. According to the efficient channel and signal transmission and reception method in a 5G communication system corresponding to the above-described embodiment, the transceiver 1901, the controller 1902, and the storage 1903 of the base station 1900 may operate. However, the elements of the base station 1900 are not limited to the above-described example. According to another embodiment, the base station 1900 may include more or fewer elements than the described elements. In addition, in a specific case, the transceiver 1901, the controller 1902, and the storage 1903 may be implemented in the form of a single chip.

According to another embodiment, the transceiver 1901 may include a transmitter and a receiver. The transceiver 1901 may transmit/receive a signal to/from a UE. The signal may include control information and data. To this end, the transceiver 1901 may include an RF transmitter for up-converting and amplifying a frequency of a transmitted signal, an RF receiver for low-noise amplifying and down-converting a received signal, and the like. In addition, the transceiver 1901 may receive a signal through a wireless channel and output the signal to the controller 1902, and may transmit the signal, which is output from the controller 1902, through the wireless channel.

The controller 1902 may control a series of processes to enable the base station 1900 to be operated according to the above-described embodiment. For example, the controller 1902 may perform a method of changing an OFDM symbol position of a DMRS by considering a method of estimating a channel by using DMRSs transmitted through a PUSCH according to an embodiment of the disclosure. To this end, the controller 1902 may include at least one processor. For example, the controller 1902 may include a communication processor (CP) for performing control for communication and an application processor (AP) for controlling a higher layer such as an application program.

The storage 1903 may store data or control information, such as information related to channel estimation using DMRSs transmitted through a PUSCH determined by the base station 1900, or control information or data received from the UE, and may include an area for storing data required for control of the controller 1902 and data generated during control of the controller 1902.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a communication system, the method comprising:
receiving, from a base station, a physical uplink shared channel (PUSCH) configuration including information indicating inter-slot frequency hopping and a number of slots for transport block (TB) processing over multiple slots (TBoMS);
receiving, from the base station, downlink control information (DCI);
identifying a starting resource block (RB) based on the DCI; and
performing PUSCH transmission of the TBoMS based on the starting RB and the number of slots for the TBoMS,
wherein the starting RB is a first starting RB in a slot where $\lfloor n_s^\mu / N_{FH} \rfloor \bmod 2 = 0$,
wherein the starting RB is a second starting RB in a slot where $\lfloor n_s^\mu / N_{FH} \rfloor \bmod 2 = 1$,
wherein the second starting RB is identified based on the first starting RB and a frequency offset, and wherein $n_s^\mu$ is a slot number and $N_{FH}$ indicates a number of slots for the frequency hopping.

2. The method of claim 1,
wherein the PUSCH configuration further includes information on the frequency offset.

3. The method of claim 1,
wherein the PUSCH configuration further includes a number of repetitions, and
wherein repetition of the PUSCH transmission of the TBoMS is performed based on the number of repetitions.

4. The method of claim 1, wherein the PUSCH configuration further includes information on the number of slots for the frequency hopping.

5. A method performed by a base station in a communication system, the method comprising:
transmitting, to a terminal, a physical uplink shared channel (PUSCH) configuration including information indicating inter-slot frequency hopping and a number of slots for transport block (TB) processing over multiple slots (TBoMS);
transmitting, to the terminal, downlink control information (DCI); and
performing PUSCH reception of the TBoMS based on a starting resource block (RB) and the number of slots for the TBoMS,
wherein the starting RB is a first starting RB in a slot where $\lfloor n_s^\mu/n_{FH} \rfloor$ mod 2=0,
wherein the starting RB is a second starting RB in a slot where $\lfloor n_s^\mu/N_{FH} \rfloor$ mod 2=1,
wherein the second starting RB is identified based on the first starting RB and a frequency offset, and
wherein $n_s^\mu$ is a slot number and $N_{FH}$ indicates a number of slots for the frequency hopping.

6. The method of claim 5,
wherein the PUSCH configuration further includes information on the frequency offset.

7. The method of claim 5,
wherein the PUSCH configuration further includes a number of repetitions, and
wherein repetition of the PUSCH transmission of the TBoMS is performed based on the number of repetitions.

8. The method of claim 5, wherein the PUSCH configuration further includes information on the number of slots for the frequency hopping.

9. A terminal in a communication system, the terminal comprising:
a transceiver; and
a processor configured to:
receive, from a base station, a physical uplink shared channel (PUSCH) configuration including information indicating inter-slot frequency hopping and a number of slots for transport block (TB) processing over multiple slots (TBoMS),
receive, from the base station, downlink control information (DCI),
identify a starting resource block (RB) based on the DCI, and
perform PUSCH transmission of the TBoMS based on the starting RB and the number of slots for the TBoMS,
wherein the starting RB is a first starting RB in a slot where $\lfloor n_s^\mu/N_{FH} \rfloor$ mod 2=0,
wherein the starting RB is a second starting RB in a slot where $\lfloor n_s^\mu/N_{FH} \rfloor$ mod 2=1,
wherein the second starting RB is identified based on the first starting RB and a frequency offset, and
wherein $n_s^\mu$ is a slot number and $N_{FH}$ indicates a number of slots for the frequency hopping.

10. The terminal of claim 9,
wherein the PUSCH configuration further includes information on the frequency offset.

11. The terminal of claim 9, wherein the PUSCH configuration further includes a number of repetitions, and
wherein repetition of the PUSCH transmission of the TBoMS is performed based on the number of repetitions.

12. The terminal of claim 9, wherein the PUSCH configuration further includes information on the number of slots for the frequency hopping.

13. A base station in a communication system, the base station comprising:
a transceiver; and
a processor configured to:
transmit, to a terminal, a physical uplink shared channel (PUSCH) configuration including information indicating inter-slot frequency hopping and a number of slots for transport block (TB) processing over multiple slots (TBoMS),
transmit, to the terminal, downlink control information (DCI), and
perform PUSCH reception of the TBoMS based on a starting resource block (RB) and the number of slots for the TBoMS,
wherein the starting RB is a first starting RB in a slot where $\lfloor n_s^\mu/N_{FH} \rfloor$ mod 2=0,
wherein the starting RB is a second starting RB in a slot where $\lfloor n_s^\mu/N_{FH} \rfloor$ mod 2=1,
wherein the second starting RB is identified based on the first starting RB and a frequency offset, and
wherein $n_s^\mu$ is a slot number and $N_{FH}$ indicates a number of slots for the frequency hopping.

14. The base station of claim 13,
wherein the PUSCH configuration further includes information on the frequency offset.

15. The base station of claim 13,
wherein the PUSCH configuration further includes a number of repetitions,
wherein repetition of the PUSCH transmission of the TBoMS is performed based on the number of repetitions, and
wherein the PUSCH configuration further includes information on the number of slots for the frequency hopping.

* * * * *